(12) United States Patent
Watarai

(10) Patent No.: US 6,647,824 B2
(45) Date of Patent: *Nov. 18, 2003

(54) GEAR INDICATOR FOR A BICYCLE

(75) Inventor: Etsuyoshi Watarai, Izumi (JP)

(73) Assignee: Shimano Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/059,408

(22) Filed: Jan. 31, 2002

(65) Prior Publication Data

US 2002/0083788 A1 Jul. 4, 2002

Related U.S. Application Data

(62) Division of application No. 09/872,013, filed on Jun. 4, 2001, now Pat. No. 6,370,981, which is a continuation of application No. 09/250,412, filed on Feb. 16, 1999, now Pat. No. 6,295,888.

(51) Int. Cl.$^7$ .............................. F16C 1/10; G01D 5/00
(52) U.S. Cl. ...................... 74/502.2; 74/489; 74/116; 74/28.1; 74/281
(58) Field of Search ................... 074/502.2, 501.5 R, 074/471 R, 488, 489; 340/432, 456, 461, 525

(56) References Cited

U.S. PATENT DOCUMENTS

| | | |
|---|---|---|
| 2,905,017 A | 9/1959 | Randolph |
| 3,352,173 A | 11/1967 | Freeland |
| 3,406,587 A | 10/1968 | Brilando et al. |
| 3,524,979 A | 8/1970 | Cohen |
| 3,554,156 A | 1/1971 | Kishida et al. |
| 3,554,158 A | 1/1971 | Shimano et al. |
| 3,633,437 A | 1/1972 | Ishida |
| 3,805,733 A * | 4/1974 | Gilbert .................. 116/124 R |
| 3,929,092 A * | 12/1975 | Ogura .................. 116/124 M |
| 4,550,675 A | 11/1985 | Lansinger et al. |
| 4,788,881 A | 12/1988 | Owen et al. |

(List continued on next page.)

FOREIGN PATENT DOCUMENTS

| | | |
|---|---|---|
| DE | 91 13 406.4 U1 | 2/1992 |
| EP | 0 552 775 A1 | 7/1993 |
| EP | 0 615 896 B1 | 9/1994 |
| EP | 0 629 545 A1 | 12/1994 |

(List continued on next page.)

Primary Examiner—Vinh T. Luong
(74) Attorney, Agent, or Firm—Shinjyu Global IP Counselors, LLP

(57) ABSTRACT

A gear indicator for use on a bicycle is provided remotely from the shift operating device. The gear indicator is coupled to a shift operating device via an indicator cable. The gear indicator basically includes a housing with an indicator member slidably coupled to the indicator cable with in the housing. The location of the indicator member relative to the housing indicates a gear currently engaged by the chain. In the most preferred embodiments, an indicator member is frictionally mounted on the inner wire of the indicator cable for automatically adjusting of the indicator member in the event that the cable becomes elongated or the indicator member becomes misaligned. The housing has a biasing member coupled between one wall of an interior cavity and the first end of the inner wire of the cable indicator for biasing the indicator member to one of its end positions. An abutment or stopper is provided within the housing to engage indicator member to automatically adjust the indicator member along the cable in the event that the cable becomes elongated or the indicator member becomes misaligned. In other embodiments, a gear position indicia portion of the housing is frictionally coupled to the housing for manually or automatically adjusting the gear position indicia relative to the indicator member.

20 Claims, 13 Drawing Sheets

U.S. PATENT DOCUMENTS

| | | | |
|---|---|---|---|
| 4,924,723 A | 5/1990 | Cristie | |
| 4,964,359 A | * 10/1990 | Richmond | 116/28.1 |
| 5,052,241 A | 10/1991 | Nagano | |
| 5,178,033 A | 1/1993 | Kund | |
| 5,289,794 A | 3/1994 | Jerro et al. | |
| 5,370,412 A | 12/1994 | Chou | |
| 5,458,018 A | 10/1995 | Kawakami | |
| 5,476,019 A | 12/1995 | Cheever et al. | |
| 5,701,838 A | * 12/1997 | Ito et al. | 116/28.1 |
| 5,903,214 A | 5/1999 | Watarai | |
| 6,199,446 B1 | 3/2001 | Ose | |

FOREIGN PATENT DOCUMENTS

| | | |
|---|---|---|
| EP | 0 629 860 A1 | 12/1994 |
| EP | 0 647 556 A2 | 4/1995 |
| GB | 2 169 065 A | 7/1986 |
| GB | 2 183 796 A | 6/1987 |
| JP | 29-15814 | 2/1954 |
| JP | 48-8367 | 3/1973 |
| JP | 60-95219 U | 6/1985 |
| JP | 60-23273 Y2 | 7/1985 |
| JP | 60-195229 U | 12/1985 |
| JP | 61-5348 Y2 | 2/1986 |
| JP | 63-57122 U | 4/1988 |
| JP | 1-60934 U | 4/1989 |
| JP | 1-103430 U | 7/1989 |
| JP | 6-135367 A | 5/1994 |
| JP | 6-321168 A | 11/1994 |
| JP | 7-101375 A | 4/1995 |

* cited by examiner

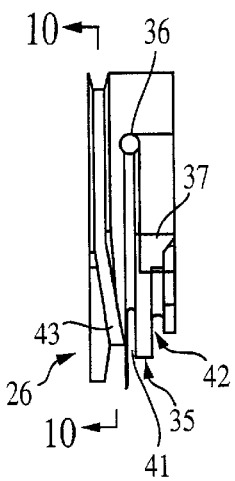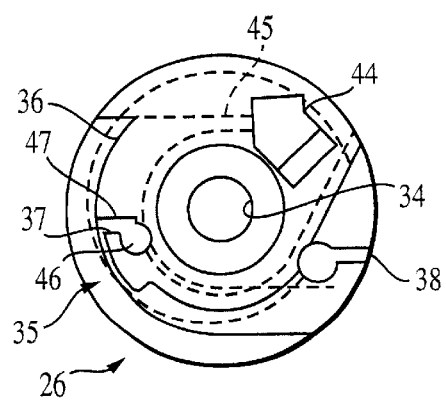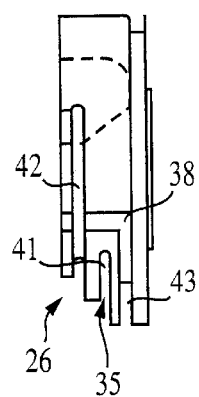
FIG. 4　　　　FIG. 5　　　　FIG. 6
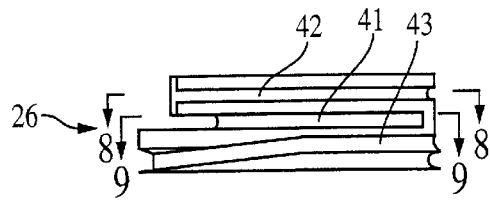
FIG. 7
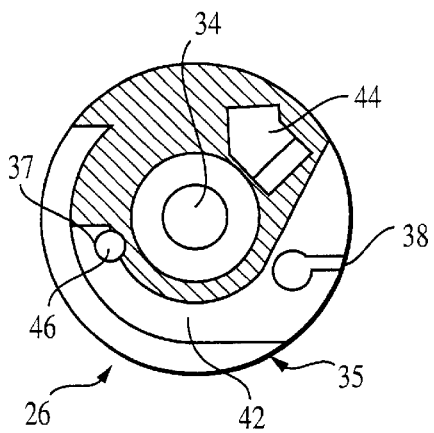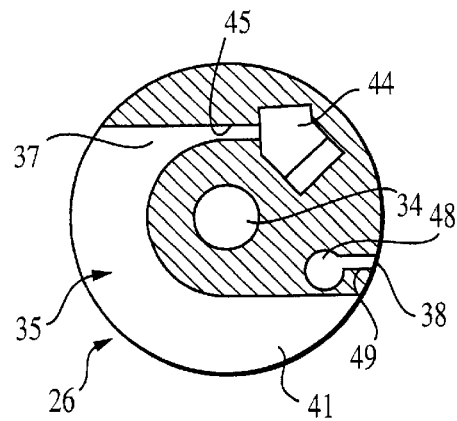
FIG. 8　　　　　　　　FIG. 9
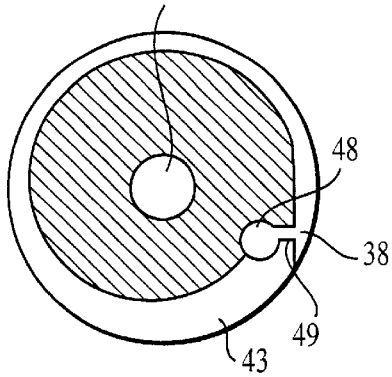
FIG. 10

GEAR INDICATOR FOR A BICYCLE

CROSS-REFERENCE TO RELATED APPLICATIONS

This application is a Divisional of application Ser. No. 09/872,013, filed on Jun. 4, 2001, now U.S. Pat. No. 6,370,981, which is a Continuation of Application Ser. No. 09/250,412, filed on Feb. 16, 1999, now U.S. Pat. No. 6,295,888.

BACKGROUND OF THE INVENTION

1. Field of the Invention

This invention generally relates to a gear indicator for a bicycle. More specifically, the present invention relates to a gear indicator that is operatively connected to a part of the transmission system of a bicycle to indicate the position of the front or rear gears of a bicycle.

2. Background Information

Bicycling is becoming an increasingly popular form of recreation as well as a means of transportation. Moreover, bicycling has become a very popular competitive sport. Whether the bicycle is used for recreation, transportation or competition, the bicycle industry is constantly improving their components. In particular, bicycle components are constantly becoming lighter and less expensive while maintaining a high level of performance. Moreover, bicycle components are constantly being designed so as to be more ergonomic and user friendly. One particular component of the bicycle that has been extensively redesigned over the past years, are the shifting units of bicycles.

There are many types of shifting units that are currently available on the market. The shifting units range in quality and price. Regardless of the quality and price of the shifting unit, the shifting unit typically will have some sort of gear position indicator. Typically, the gear position indicator is located at the take-up member of the shift operating device that winds up the inner wire of the shift control cable.

One example of an inexpensive gear position indicator is disclosed in German Publication 91 13 406.4. The gear position indicator of this German Publication is mounted in the shift cable between the shift operating device and the derailleur. The gear position indicator has a housing secured to the outer casing of the shift cable and an indicator member frictionally coupled to the inner wire of the shift cable. One problem with this gear position indicator is that the indicator member can become misaligned with the markings on the housing. The gear position indicator must be disassembled to realign the indicator member with the markings on the housing.

Another problem with some prior art gear position indicators is that the gear position indicator is mounted on the shift operating device. Thus, the rider must look towards the handle portion of the handlebars in order to determine the current gear positions. Accordingly, this is very inconvenient for the rider. An example of such a shifting device is disclosed in U.S. Pat. No. 5,458,018 to Kawakami. This patent discloses gear position indicators that are operated by a cable that is connected to the take up member. These gear position indicators do not have any adjustment mechanism for compensating for cable elongation or the indicator member becoming misaligned from the markings on the housing.

In view of the above, there exists a need for a gear indicator that can be easily adjusted in the event that the cable becomes elongated or the indicator member becomes misaligned and that overcomes the above mentioned problems in the prior art. This invention addresses this need in the prior art as well as other needs, which will become apparent to those skilled in the art from this disclosure.

SUMMARY OF THE INVENTION

One object of the present invention is to provide a gear indicator that can be easily adjusted in the event that the cable becomes elongated or the indicator member becomes misaligned.

Another object of the present invention is to provide a gear indicator that can be remotely mounted on a center portion of the handlebar for easy viewing of the gear position.

Another object of the present invention is to provide a gear indicator that is lightweight in design.

Another object of the present invention is to provide a gear indicator that can be relatively easy to manufacture by conventional manufacturing techniques.

Yet still another object of the present invention is to provide a gear indicator that is relatively inexpensive to manufacture.

Another object of the present invention is to provide an indicator for a bicycle which overcomes the disadvantages of the prior art noted above.

The above objects can be fulfilled, according to the present invention, by providing a gear indicator for indicating the current gear position of the bicycle. The gear indicator is coupled to a shift operating device via a cable. The gear indicator for the bicycle basically comprises a cable having a first cable end and an indicator member slidably coupled to the cable adjacent the first cable end; a housing having the first cable end and the indicator member movably located therein, and a viewing opening to view movement of the indicator member; and a biasing member having a first biasing end coupled to the first cable end and a second biasing end coupled to the housing.

In a preferred embodiment, an indicator member is frictionally mounted on the inner wire of the indicator cable for automatically adjusting the indicator member in the event that the cable becomes elongated or the indicator member becomes misaligned. The housing has a biasing member coupled between one wall of an interior cavity and the first end of the inner wire of the cable indicator for biasing the indicator member to one of its end positions. An abutment or stopper is provided within the housing to engage indicator member to automatically adjust the indicator member along the cable in the event that the cable becomes elongated or the indicator member becomes misaligned. In other embodiments, a gear position indicia portion of the housing is frictionally coupled to the housing for manually or automatically adjusting the gear position indicia relative to the indicator member.

Consequently, the position of the indicator member relative to the inner wire is automatically adjusted when indicator cable is permanently elongated or the indicator member becomes misaligned with the markings on the housing. In this way, a permanent elongation of the wire and the like is automatically adjusted. This automatic adjustment may be utilized also when the indicator is installed initially.

These and other objects, features, aspects and advantages of the present invention will become apparent to those skilled in the art from the following detailed description, which, taken in conjunction with the annexed drawings, discloses several preferred embodiments of the present invention.

BRIEF DESCRIPTION OF THE DRAWINGS

Referring now to the attached drawings which form a part of this original disclosure:

FIG. 4 is a first side elevational view of a take up member for the right shift operating device illustrated in FIGS. 2 and 3 in accordance with one embodiment of the present invention;

FIG. 5 is a top plan view of the take up member illustrated in FIG. 4 for the right shift operating device illustrated in FIGS. 2 and 3 in accordance with one embodiment of the present invention;

FIG. 6 is a second side elevational view of the take up member illustrated in FIGS. 4 and 5 for the right shift operating device illustrated in FIGS. 2 and 3 in accordance with one embodiment of the present invention;

FIG. 7 is a third side elevational view of the take up member illustrated in FIGS. 4 through 6 for the right shift operating device illustrated in FIGS. 2 and 3 in accordance with one embodiment of the present invention;

FIG. 8 is a transverse cross-sectional view of the take up member illustrated in FIGS. 4 through 7 in accordance with one embodiment of the present invention as viewed along section line 8—8 of FIG. 7;

FIG. 9 is a transverse cross-sectional view of the take up member illustrated in FIGS. 4 through 8 in accordance with one embodiment of the present invention as viewed along section line 9–9 of FIG. 7;

FIG. 10 is a transverse cross-sectional view of the take up member illustrated in FIGS. 4 through 9 in accordance with one embodiment of the present invention as viewed along section line 10—10 of FIG. 4;

DETAILED DESCRIPTION OF THE PREFERRED EMBODIMENTS

Figure 1:
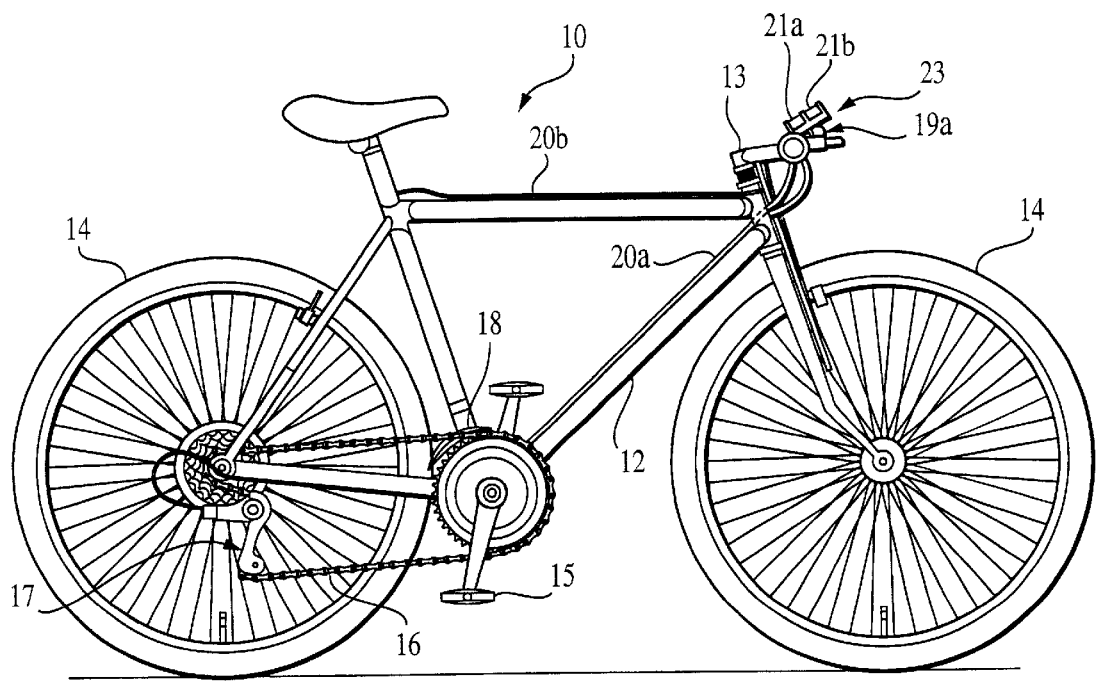
FIG. 1 is a side elevational view of a conventional bicycle equipped with a shifting unit in accordance with one embodiment of the present invention.
Figure 2:
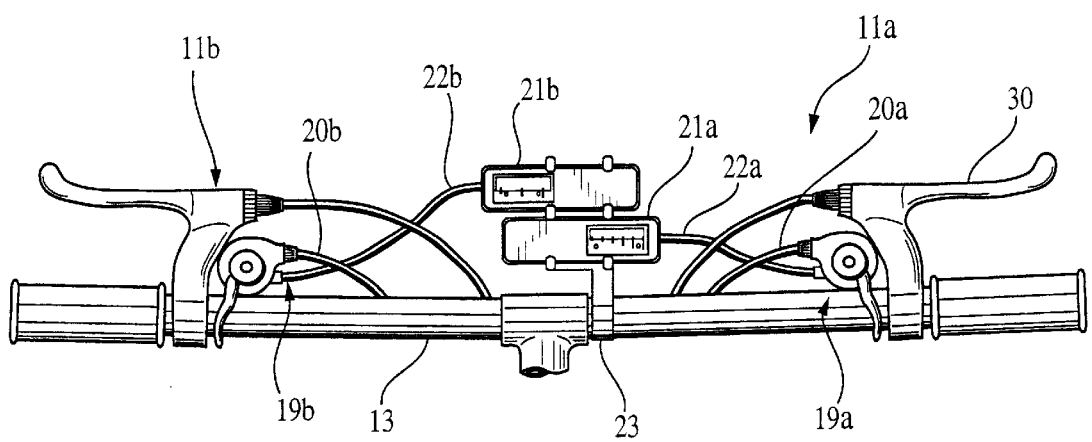
FIG. 2 is a partial top plan view of the handlebar of the conventional bicycle equipped with the shifting unit mounted together with a brake lever assembly in accordance with one embodiment of the present invention.

Referring initially to FIGS. 1 and 2, a conventional bicycle 10 is illustrated with a pair of shifting units 11a and 11b coupled thereto in accordance with a first embodiment of the present invention. Bicycle 10 is a typical bicycle that includes a frame 12, a handlebar 13, a pair of wheels 14, a pair of pedals 15 for driving a chain 16, a rear derailleur 17 that guides chain 16 laterally along a plurality of rear sprockets mounted to rear wheel 14 and a from derailleur 18 that guides chain 16 laterally along a plurality of front sprockets mounted to the bottom bracket (not shown).

Bicycle 10 and its various components, except for shifting units 11a and 11b, are well-known in the prior art. Thus, bicycle 10 and its various components will not be discussed or illustrated in detail herein, except for the components that relate to the present invention. In other words, only shifting units 11a and 11b and the components that relate thereto will be discussed and/or illustrated herein.

Shifting units 11a and 11b are fixedly coupled to handlebar 13 of bicycle 10 and operatively coupled to rear derailleur 17 and front derailleur 18. Each of these shifting units 11a and 11b are substantially identical to each other, except that shifting unit 11a is coupled to rear derailleur 17 which has seven shift positions, and shifting unit 11b is operatively coupled to front derailleur 18 which has only three gear shifting positions. Of course, it will be apparent to those skilled in the art that shifting units 11a and 11b can have any number of gear shifting positions. The number of gear shifting positions or stages will depend upon the number of gears or sprockets used in the bicycle's transmission. In other words. while shifting unit 11a is illustrated as a seven-stage shifting unit and shifting unit 11b is illustrated as a three-stage shifting unit, it will be apparent to those skilled in the art from this disclosure that shifting units 11a and 11b can be constructed with additional stages or fewer stages as needed and/or desired.

As used herein, the terms "forward, rearward, upward, above, downward, below and transverse" refer to those directions of a bicycle in its normal riding position. Accordingly, these terms as utilized to describe shifting units 11a and 11b in the claims, should be interpreted relative to bicycle 10 in its normal riding position.

Shifting unit 11a basically includes a first shift operating device 19a operatively coupled to rear derailleur 17 via first shift cable 20a, and a first gear indicator 21a operatively coupled to first shift operating device 19a by a first indicator cable 22a. Similarly, shifting unit 11b basically includes a second shift operating device 19b operatively coupled to front derailleur 18 via second shift cable 20b, and a second gear indicator 21b operatively coupled to second shift operating device 19b by a second indicator cable 22b.

Basically, shift operating devices 19a and 19b are substantially identical to each other, except that they are mirror images and have different numbers of gear shifting stages. Preferably, first shift operating device 19a has seven shifting stages, while second shift operating device 19b has three shift operating stages. Similarly, first gear indicator 21a is substantially identical to second gear indicator 21b, except that they are substantial mirror images and have different numbers of shifting stages. The shifting stages of gear indicators 21a and 21b correspond to the number of shifting stages in shift operating devices 19a and 19b, respectively. In other words, if first shift operating device 19a has seven shift stages, first gear indicator 21a has seven gear indicating positions. Likewise, if second shift operating device 19b has three shifting stage positions, second gear indicator 21b also has three gear indicating positions.

Figure 25:
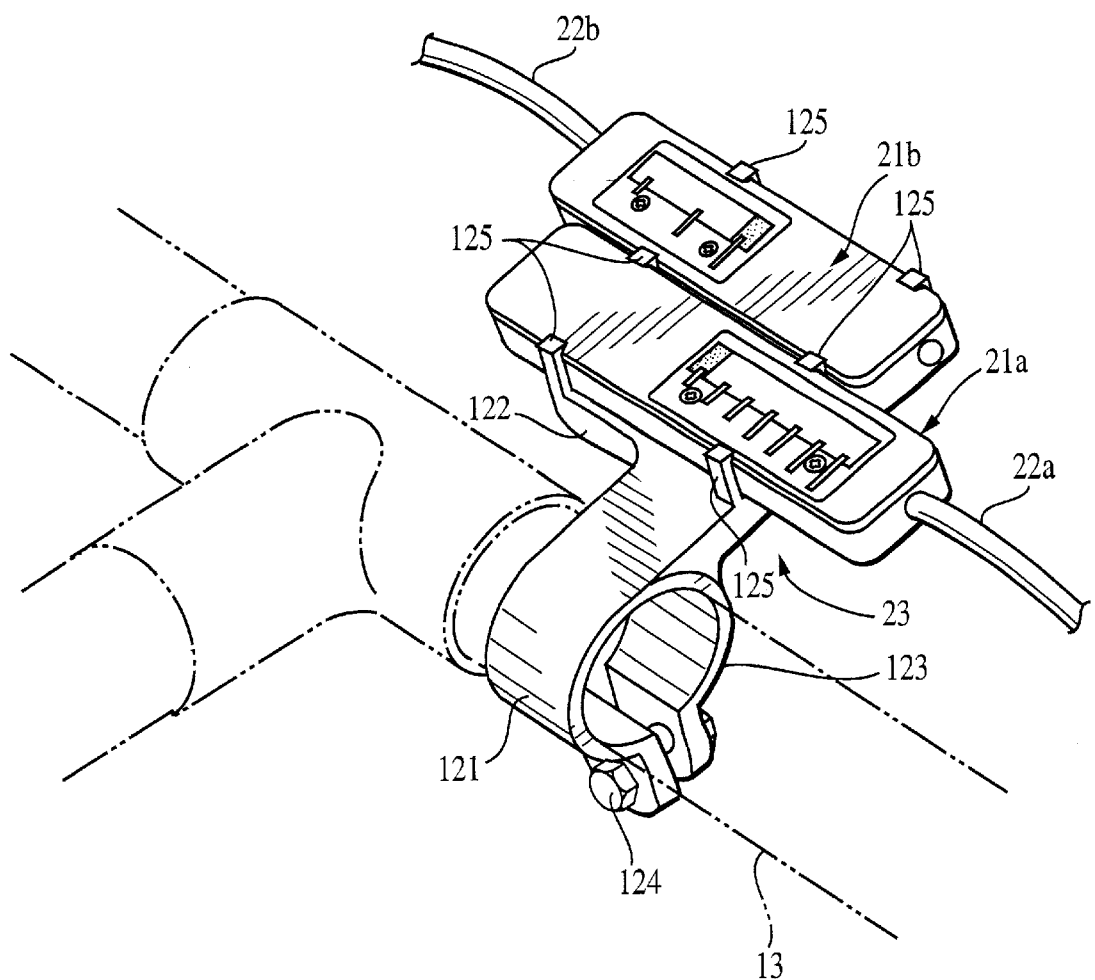
FIG. 25 is a partial front perspective view of the handlebar with the gear indicators mounted thereto by the gear indicator holder in accordance with one embodiment of the present invention.
Figure 26:
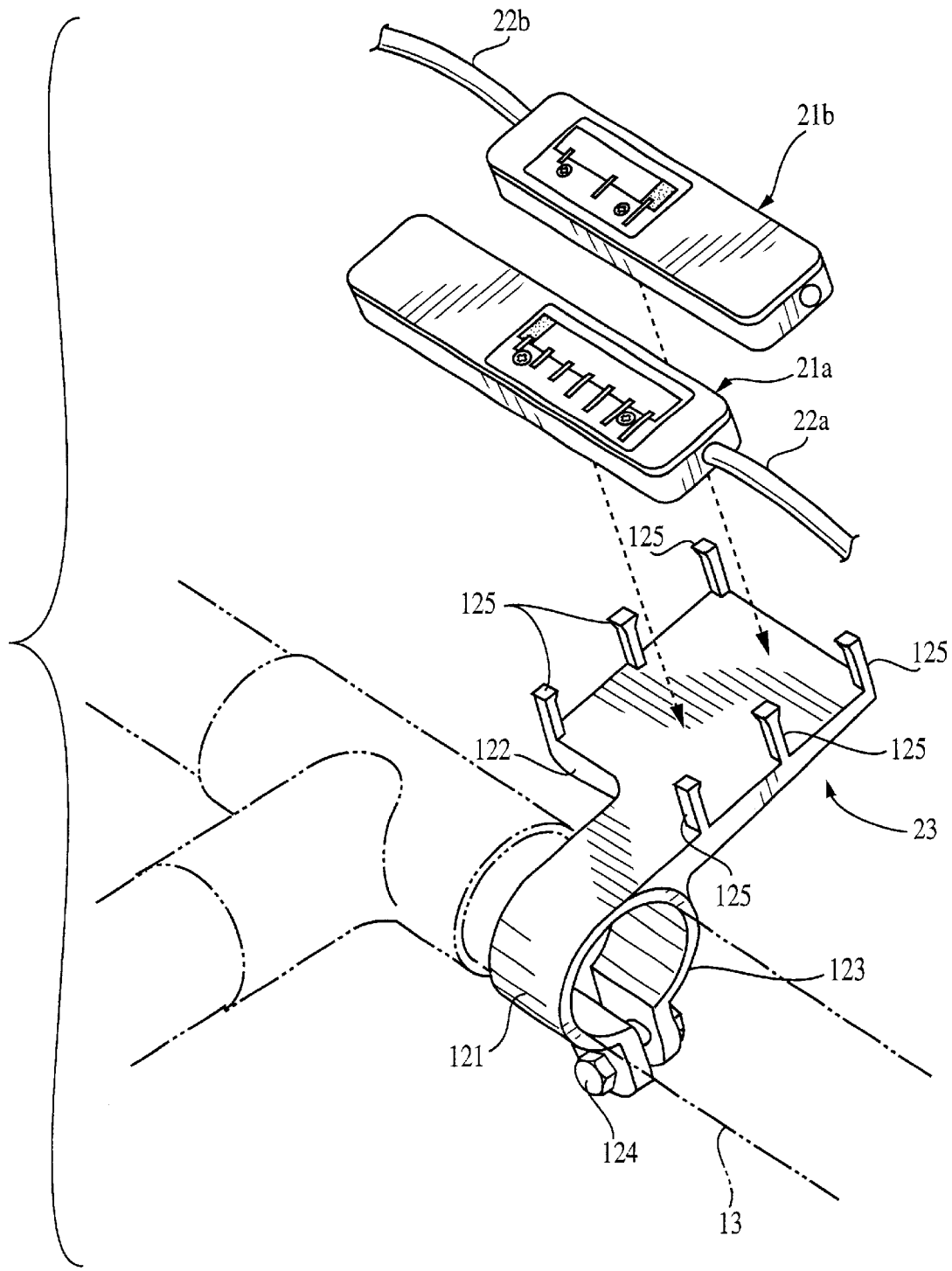
FIG. 26 is an exploded partial front perspective view of the handlebar with the gear indicators mounted thereto by the gear indicator holder illustrated in FIG. 25 in accordance with the present invention.

As seen in FIGS. 2, 25 and 26, a gear indicator holder 23 is illustrated for adjustably supporting first and second gear indicators 21a and 21b discussed in more detail. Gear indicator holder 23 is designed to allow the shifting units 11a and 11b to be easily installed onto handlebars 13. Moreover, the gear indicator holder 23 is designed to accommodate various handlebars. Gear indicator holder 23 adjustably supports gear indicators 21a and 21b such that gear indicators 21a and 21b can move in a direction that is substantially perpendicular to the vertical center plane of the bicycle. More specifically, gear indicator holder 23 is designed to be mounted adjacent to the center of the handlebar 13 with the gear indicators 21a and 21b being slidably coupled thereto for movement generally along the longitudinal axis of handlebar 13. Gear indicator is discussed in more detail below.

In view of the similarities between shift operating device 19a and shift operating device 19b, shift operating device 19b will not be discussed or illustrated in detail herein. Rather, it will be apparent to those skilled in the art from this disclosure that the description and illustrations of shift operating device 19a applies to the construction and operation of shift operating device 19b. Similarly, gear indicator 21b will not be discussed or illustrated in detail herein. Rather, it will be apparent to those skilled in the art from this disclosure that the construction and operation of second gear indicator 21b can be obtained from the description of first gear indicator 21a.

Figure 3:
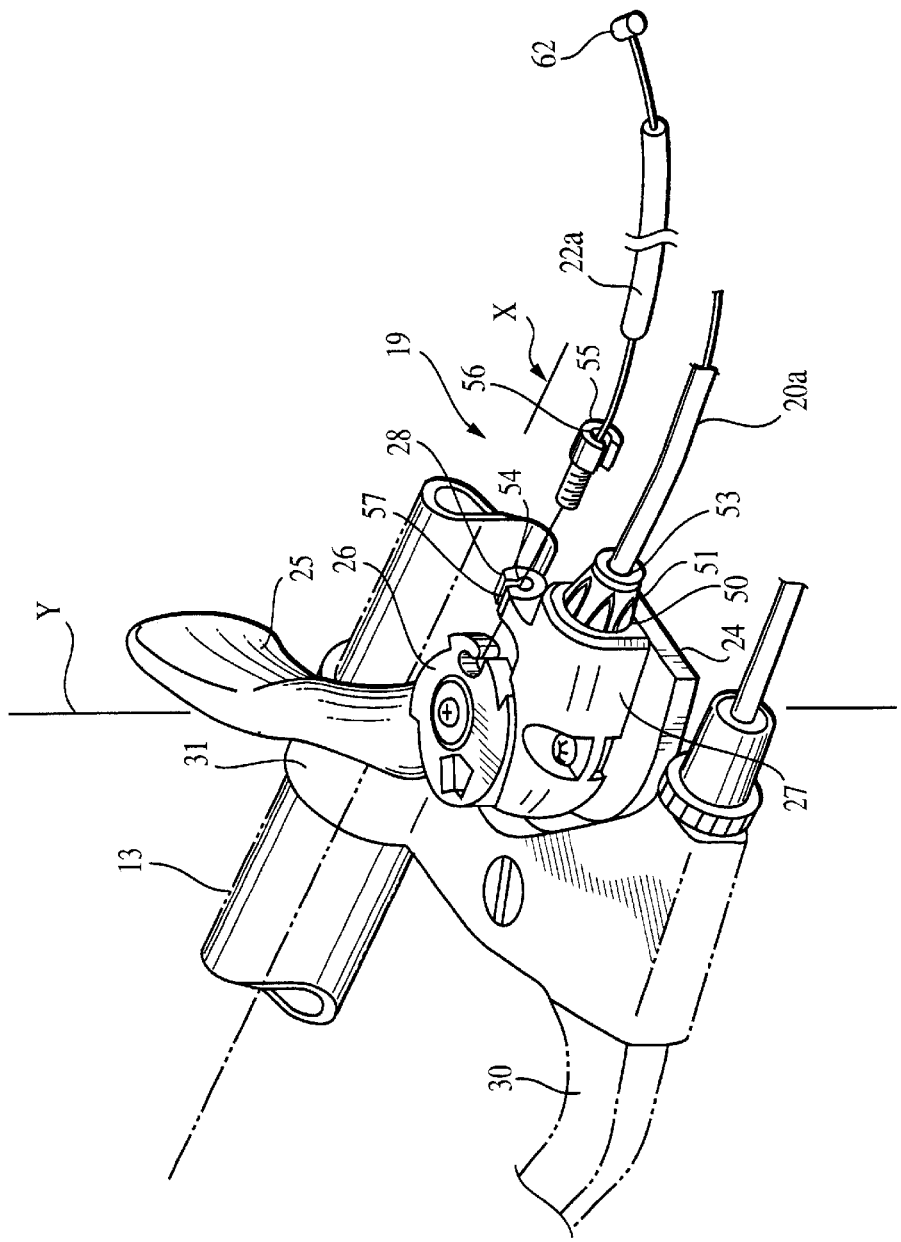
FIG. 3 is a partial front perspective view of the handlebar with the right shift operating device coupled thereto in accordance with one embodiment of the present invention.

Referring to FIGS. 2 and 3, shift operating device 19a basically includes an attachment portion 24, a hand operating portion 25, a take-up member 26, a shift cable housing support 27 and an indicator cable housing support 28. Shift operating device 19a is operatively coupled to rear derailleur 17 via first shift cable 20a and operatively coupled to first gear indicator 21a via first indicator cable 22a.

Attachment portion 24 of this embodiment of shift operating device 19a is also the attachment portion for a brake lever 30. Of course, it will be apparent to those skilled in the art that attachment portion 24 can be separate from the brake lever 30. Brake lever 30 is connected to a brake control cable for controlling a brake device in a conventional manner.

In the preferred embodiment, attachment portion 24 has a substantially circular clamping section 31 that has a longitudinal split to form a pair of clamping jaws. The clamping jaws of clamping section 31 are coupled together by a fastener (not shown) for tightening the clamping section 31 about handlebar 13. Since the attachment portion 24 is relatively conventional to those skilled in the art, attachment portion 24 will not be discussed or illustrated in further detail herein.

Attachment portion 24 preferably has pivot shaft (not shown) for rotatably mounting take up member 26 thereto. The pivot shaft has a free end with a thread hole for threadedly receiving a fastener (not shown) therein. Since the precise connection between attachment portion 24 and take up member 26 is not important to the present invention, the connection between attachment portion 24 and take up member 26 will not be discussed or illustrated further detail herein.

In this embodiment, hand operating portion 25 is in the form of a lever that is fixedly coupled to take up member 26. When a rider pushes hand operating portion or lever 25, this movement of hand operating portion or lever 25 causes take up member 26 to pivot about a rotational axis Y together with hand operating portion or lever 25. This movement of hand operating portion or lever 25 about rotational axis Y also causes the first shift cable 20a to be pulled and/or released so as to shift the rear derailleur 17. This shifting of rear derailleur 17 causes the chain 16 to move between gears. Movement of hand operating portion or lever 25 also causes indicator cable 22a to be released or pulled so that gear indicator 21a displays the current gear position of chain 16.

Take up member 26 is rotatably mounted on attachment portion 24 for rotating or pivoting about rotational axis Y due to movement of hand operating portion 25. The precise pivotal connection between take up member 26 and attachment portion 24 is not critical to the present invention. Therefore, this connection will not be discussed or illustrated in detail herein. Moreover, it will be readily apparent to those skilled in the art from this disclosure that the connection can be similar to one of the subsequent embodiments disclosed herein.

Preferably, as best seen in FIGS. 4 through 10, take up member 26 is a cylindrical spool-type member with an axially extending center hole 34, a peripheral winding surface 35, a shift cable attachment point 36, an indicator cable attachment point 37, a connecting cable attachment point 38. Preferably, center hole 34 is rotatably mounted on the pivot shaft (not shown) extending outwardly from attachment portion 24 for rotation about rotational axis Y.

While three attachment points are illustrated in this embodiment, it will be readily apparent to those skilled in the art from this disclosure that only shift cable attachment point 36 and an indicator cable attachment point 37 are necessary for this embodiment. Connecting cable attachment point 38 is utilized in another embodiment of the present invention, which is discussed below.

Peripheral winding surface 35 has three peripheral winding grooves or recesses 41, 42 and 43. While three peripheral winding grooves or recesses are illustrated in this embodiment, it will be readily apparent to those skilled in the art from this disclosure that only two peripheral winding grooves or recesses are necessary for this embodiment. The third peripheral winding groove or recess is utilized in another embodiment of the present invention, which is discussed below.

Groove 41 is adapted to receive the shift cable 20a, while groove 42 is designed to receive the indicator cable 22a. Accordingly, rotation of take up member 26 will cause indicator cable 22a and shift cable 20a to either be wound around peripheral winding surface 35 or unwound from peripheral winding surface 35.

As best seen in FIGS. 4, 5 and 9, shift cable attachment point 36 is preferably formed by an axially extending hole 44 and a outwardly extending slot 45. Slot 45 connects with peripheral winding groove 41. Shift cable attachment point 36 is basically formed along the peripheral winding surface 35.

As best seen in FIGS. 4, 5 and 8, indicator cable attachment point 37 is formed by an axially extending hole 46 and a connecting slot 47 that exits out of the take up member 26 along its peripheral winding surface 35. Slot 47 connects with peripheral winding groove 42. The slots 45 and 47 of shift cable attachment point 36 and indicator cable attachment point 37 are such that shift cable 20a and indicator cable 22a extends in a substantially parallel manner from take up member 26. The term "substantially parallel" as utilized to describe the indicator cable 22a and the shift cable 20a exiting the take up member 26 and the support housings should be construed as meaning an angle of as high as approximately 30°.

As best seen in FIGS. 4, 5 and 10 connecting cable attachment point 38 is formed by an axially extending hole 48 and a connecting slot 49 that exits out of the take up member 26 along its peripheral winding surface 35. Slot 49 connects with peripheral winding groove 43. Slot 49 extends in substantially the opposite direction from slots 45 and 47 of shift cable attachment point 36 and indicator cable attachment point 37.

Referring back to FIG. 3, also the shift cable housing support 27 and the indicator cable housing support 28 are fixedly mounted on attachment portion 24. In accordance with this preferred embodiment, the shift cable housing support 27 and the indicator cable housing support 28 have a common outer support that is fastened to attachment portion 24 via a conventional fastener such as a screw or rivet (not shown). Alternatively, outer support for shift cable housing support 27 and indicator cable housing support 28 can be integrally formed with a portion of attachment portion 24 as seen in one of the later embodiments.

Preferably, shift cable housing support 27 has a threaded bore 50 for receiving an adjustment member or barrel 51 therein. The adjustment member 51 is threadedly received in the threaded bore 50 of shift cable housing support 27 so that the relative position of the outer casing and the inner wire of shift cable 20a can be adjusted relative to each other. Adjustment member 51 has a shift cable housing receiving bore 53. This shift cable housing receiving bore 53 is preferably a bore with a four to five millimeter diameter or slightly larger than a five millimeter diameter. In particular, shift cable housing receiving bore 53 is designed to receive a four or five millimeter diameter shift cable 20a. Preferably, the longitudinal axis of shift cable housing receiving bore 53 extends substantially parallel to the longitudinal axis of handlebar 13.

A resistance enhancing spring (not shown) can be optionally disposed within adjustment member 51 to prevent inadvertent movement of adjustment member 51. Cable Adjustment member 51 operates in a well-known manner to adjust the tension on the inner wire of shift cable 20a.

Indicator cable housing support 28 preferably has a threaded bore 54 for receiving an adjustment member 55 such that the adjustment member 55 can be longitudinally adjusted relative to indicator cable housing support 28. The adjustment member 55 has an axially extending indicator housing receiving bore 56. Indicator cable housing receiving bore 56 is substantially parallel to shift cable housing receiving bore 53 such that shift cable 20a and indicator cable 22a extend substantially parallel to the longitudinal axis X of the handlebar 13 as they exit their respective cable housing supports 27 and 28. A slit 57 is formed in indicator cable housing support 28 and adjustment member 55 to permit easy installation of indicator cable 22a.

Since indicator cable 22a is only operating gear indicator 21a, indicator cable 22a can be constructed of a smaller cable than shift cable 20a. For example, shift cable 20a is preferably a four to five millimeter diameter cable and indicator cable 22a is preferably a three to four millimeter diameter cable. In other words, shift cable 20a and indicator cable 22a are substantially the same diameter with indicator cable 22a being slightly smaller in diameter than shift cable 20a.

Shift cable 20a preferably has a nipple 60 fixedly coupled on a first cable end, while the other cable end is a free end. Indicator cable 22a, on the other hand, preferably, has a nipple 61 fixedly coupled at a first end and a nipple 62 fixedly coupled at a second end. The nipple 60 of the shift cable 20a is adapted to be coupled to the shift cable attachment point 36, while the other end of shift cable 20a is coupled to rear derailleur 17. The nipple 61 of the indicator cable 22a is adapted to be coupled to the indicator cable attachment point 37 of take-up member 26, while nipple 62 is adapted to be coupled to the gear indicator 21a.

Figure 11:
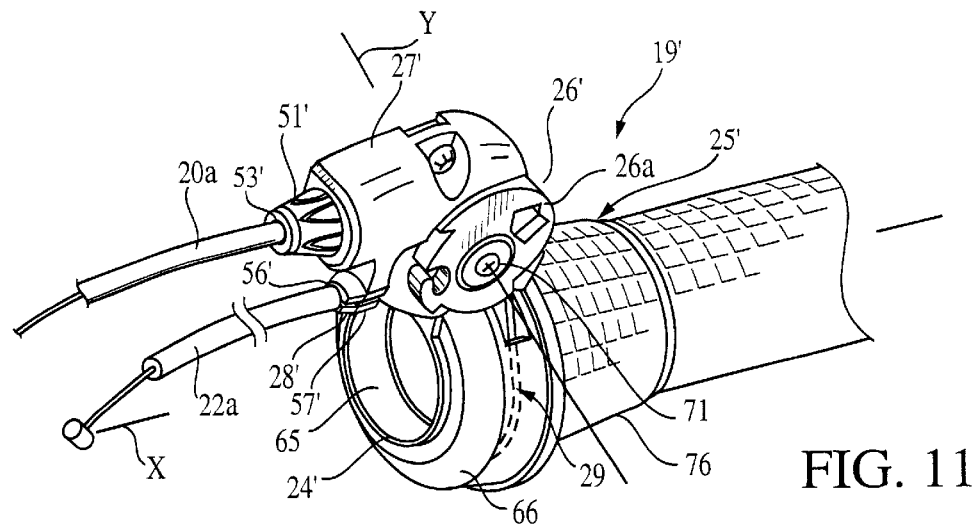
FIG. 11 is a partial perspective view of a right shift operating device coupled thereto in accordance with another embodiment of the present invention.
Figure 12:
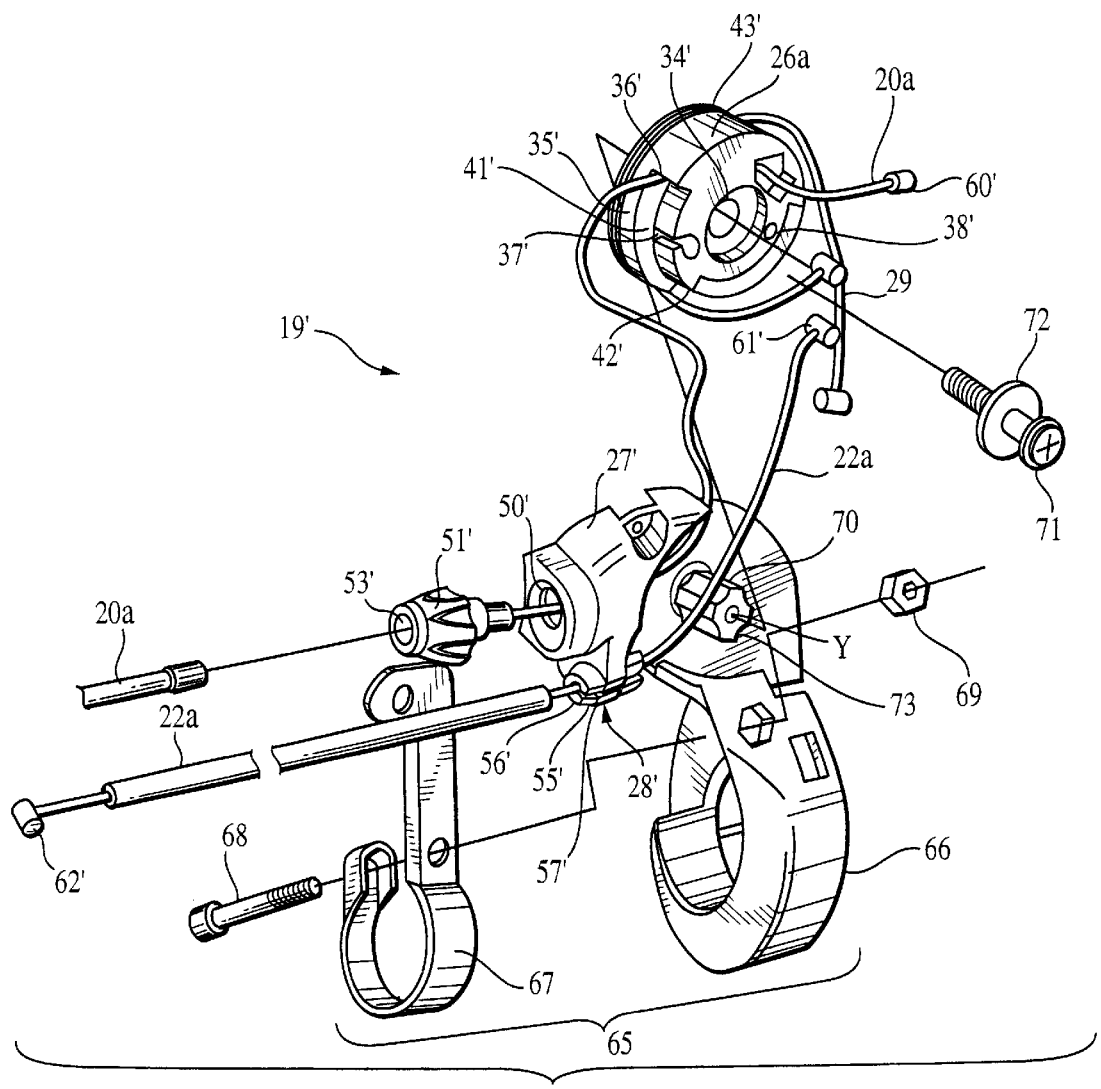
FIG. 12 is an exploded perspective view of a portion of right shift operating device illustrated in FIG. 11 with certain parts not illustrated.
Figure 13:
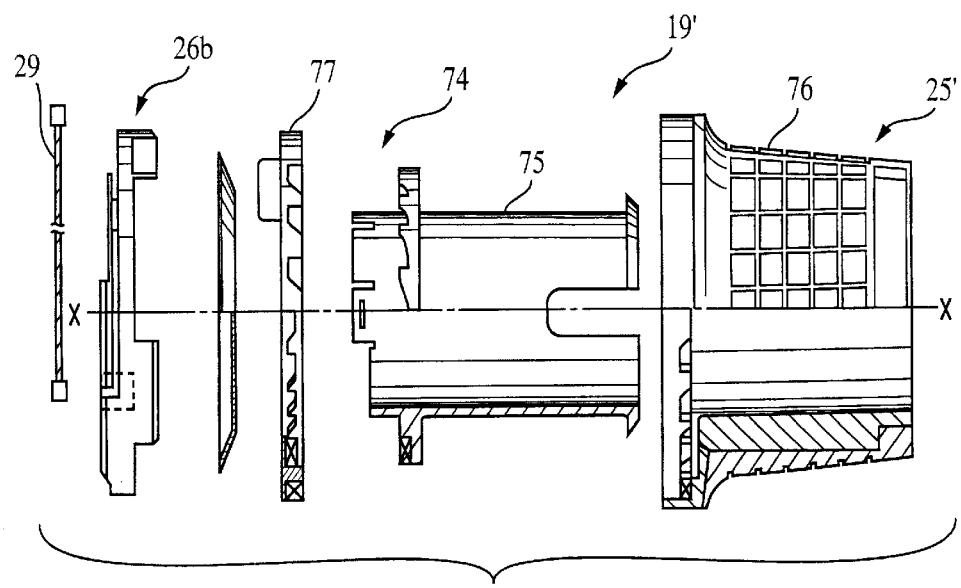
FIG. 13 is an exploded elevational view of a portion or right shift operating device illustrated in FIGS. 11 and 12 with certain parts not illustrated.

Referring now to FIGS. 11 through 13, an alternate shift operating device 19' is illustrated in accordance with another embodiment of the present invention. This alternative shift operating device 19' is designed to be utilized with either first or second gear indicators 21a or 21b as well as with gear indicator holder 23. This shift operating device 19' is a grip-type of shifting device. In particular, rotation of the grip or hand operating portion 25' causes the shift cable 20a and the indicator cable 22a to be released or pulled for shifting gears.

As shown in FIG. 11, shift operating device 19' basically includes an attachment portion 24', a hand operating portion 25', a take-up member 26' (first and second take up parts 26a and 26b connected by a connecting cable 29), a shift cable housing support 27' and an indicator cable housing support 28'. Shift operating device 19' is operatively coupled to rear or front derailleur 17 or 18 via shift cable 20a or 20b and operatively coupled to one of the gear indicator 21a or 21b via indicator cable 22a or 22b. Shift operating device 19' is mounted around the handlebar 13 via clamping section 65. Hand operating portion 25' is a rotatable handgrip that is structured for rotation around an axis X that is coaxial with handlebar 13. Take-up member 26' pulls and releases the inner wires of shift cable 20a and via indicator cable 22a as well as pulls and releases connecting cable 29.

FIGS. 12 and 13 are an exploded view of a portion of shift operating device 19' illustrating attachment portion 24', hand operating portion 25' and take up member 26' in more detail. The attachment portion 24' has a clamping section 65 that is used to fasten shift operating device 19' to handlebar 13 and a support section 66. Clamping section 65 includes a collar-shaped clamp member 67 structured to mount around handlebar 13 with a clamp arm extending from clamping section 65 to couple the shift cable housing support 27' and the indicator cable housing support 28' thereto.

Clamp section 65 also includes a clamping fastener 68 and a nut 69 for a fastening attachment portion 24' to a portion of handlebar 13. In particular, tightening clamping fastener 68 with nut 69 causes clamping section 65 to tighten around a portion of handlebar 13.

The attachment portion 24' also has a generally flat surface with a pivot shaft 70 extending outwardly therefrom to rotatably support first take up part 26a of take up member 26' around an axis Y that is oriented differently (e.g., perpendicular) relative to the handlebar axis X.

First take up part 26a of take up member 26' is retained on pivot shaft 70 by a fastener 71 and washer 72. The fastener 71 extends into a threaded opening 73 formed in the end of pivot shaft 70. First take up part 26a of take up member 26' is preferably identical to take up member 26 of the first embodiment as seen in FIGS. 4–10. Accordingly, first take up part 26a of take up member 26' will not be separately illustrated herein.

Preferably, first take up part 26a of take up member 26' is a cylindrical spool-type member with an axially extending center hole 34', a peripheral winding surface 35', a shift cable attachment point 36', an indicator cable attachment point 37', a connecting cable attachment point 38'. Preferably, first take up part 26a is rotatably mounted on the pivot shaft 70 extending outwardly from attachment portion 24' for rotation about rotational axis Y.

Peripheral winding surface 35' has three peripheral winding grooves or recesses 41', 42' and 43'. The third peripheral winding groove or recess is utilized in another embodiment of the present invention, which is discussed below.

Groove 41' is adapted to receive the shift cable 20a. Groove 42' is designed to receive the indicator cable 22a. Groove 43' is designed to receive the connecting cable 29. Accordingly, rotation of take up member 26' will cause shift cable 20a, indicator cable 22a and the connecting cable 29 to either be wound around peripheral winding surface 35' or unwound from peripheral winding surface 35'.

Shift cable attachment point 36' is preferably formed by an axially extending hole and an outwardly extending slot that connects with peripheral winding groove 41'. Shift cable attachment point 36' is basically formed along the peripheral winding surface 35'. Indicator cable attachment point 37' is formed by an axially extending hole and a connecting slot that exits out of the first take up part 26a along its peripheral winding surface 35' to connect with peripheral winding groove 42'. The slots of shift cable attachment point 36' and indicator cable attachment point 37' are such that shift cable 20a and indicator cable 22a extend in a substantially parallel manner from first take up part 26a. The term "substantially parallel" as utilized to describe the indicator cable 22a and the shift cable 20a exiting first take up part 26a and the support housings should be construed as meaning an angle of as high as approximately 30°. Connecting cable attachment point 38' is formed by an axially extending hole and a connecting slot that exits out of the first take up part 26a along its peripheral winding surface 35' to connect with peripheral winding groove 43'.

FIG. 13 is an exploded view of a particular embodiment of the second take up part 26b of the take member 26' and indexing mechanism 74 of the hand operating portion 25'. As shown in FIGS. 11 and 13, second take up part 26b of the take member 26' is rotatably coupled about the axis X of handlebar 13. Preferably, indexing mechanism 74 of the hand operating portion 25' is used to control the movement of second take up part 26b of the take member 26' which in turn rotates first take up part 26a by connecting cable 29.

As seen in FIG. 13, indexing mechanism 74 preferably includes a fixed member 75, a rotatable handgrip or hand actuator 76 and an intermediate element 77. The fixed member 75 is fixedly attached to handlebar 13 in such a way that it cannot rotate in relation to handlebar 13. Rotatable handgrip 76 is a tubular member with gripping protrusions capable of rotating around the handlebar axis X on fixed member 75.

Rotatable handgrip 76 can have a variety of shapes. Thus, the term "tubular member" as used herein is not limited to a cylindrical tube, but also includes non-circular tubes as well as frustoconically shapes of circular and non-circular tubes.

Intermediate element 77 (called "an idler") meshes with both the fixed member 75 and the rotatable handgrip 76, and can rotate around the handlebar axis X. Intermediate element 77 can also move along the handlebar axis X. Take-up part 26b of the take member 26' remains in constant gear engagement with the intermediate element 77, and can thus rotate integrally with intermediate element 77. Indexing mechanisms such as indexing mechanism 74 are well-known in the art, and thus, indexing mechanism 74 will not be discussed or illustrated in detail herein.

A cable adjustment barrel or member 51' is threaded into the end of the shift cable housing 27'. The cable adjustment barrel or member 51' receiving outer casing of shift cable 20a. The cable adjustment barrel or member operates in a manner to adjust the tension on inner wire of shift cable 20a.

Also fixedly mounted on attachment portion 24' are the shift cable housing support 27' and the indicator cable housing support 28'. In accordance with this preferred embodiment, the shift cable housing support 27' and the indicator cable housing support 28' have a common outer support that is fastened to attachment portion 24' via a conventional fastener such as a screw or rivet (not shown). Alternatively, outer support for shift cable housing support 27' and indicator cable housing support 28' can be integrally formed with a portion of attachment portion 24 as seen in one of the later embodiments.

Preferably, shift cable housing support 27' has a threaded bore 50' for receiving an adjustment member or barrel 51' therein. The adjustment member 51' is threadedly received in the threaded bore 50' of shift cable housing support 27' so that the relative position of the outer casing and the inner wire of shift cable 20a can be adjusted relative to each other. Adjustment member 51' has a shift cable housing receiving bore 53'. This shift cable housing receiving bore 53' is preferably a bore with a four to five millimeter diameter or slightly larger than a five millimeter diameter. In particular, shift cable housing receiving bore 53' is designed to receive a four or five millimeter diameter shift cable 20a. Preferably, the longitudinal axis of shift cable housing receiving bore 53' extends substantially parallel to the longitudinal axis of handlebar 13.

Indicator cable housing support 28' preferably has a threaded bore (not shown) for receiving an adjustment member 55' such that the adjustment member 55' can be longitudinally adjusted relative to indicator cable housing support 28'. The adjustment member 55' has an axially extending indicator housing receiving bore 56'. Indicator cable housing receiving bore 56' is substantially parallel to shift cable housing receiving bore 53' such that shift cable 20a and indicator cable 22a extend substantially parallel to the longitudinal axis X of the handlebar 13 as they exit their respective cable housing supports 27' and 28'. A slit 57' is formed in indicator cable housing support 28' and adjustment member 55' to permit easy installation of indicator cable 22a.

Figure 14:
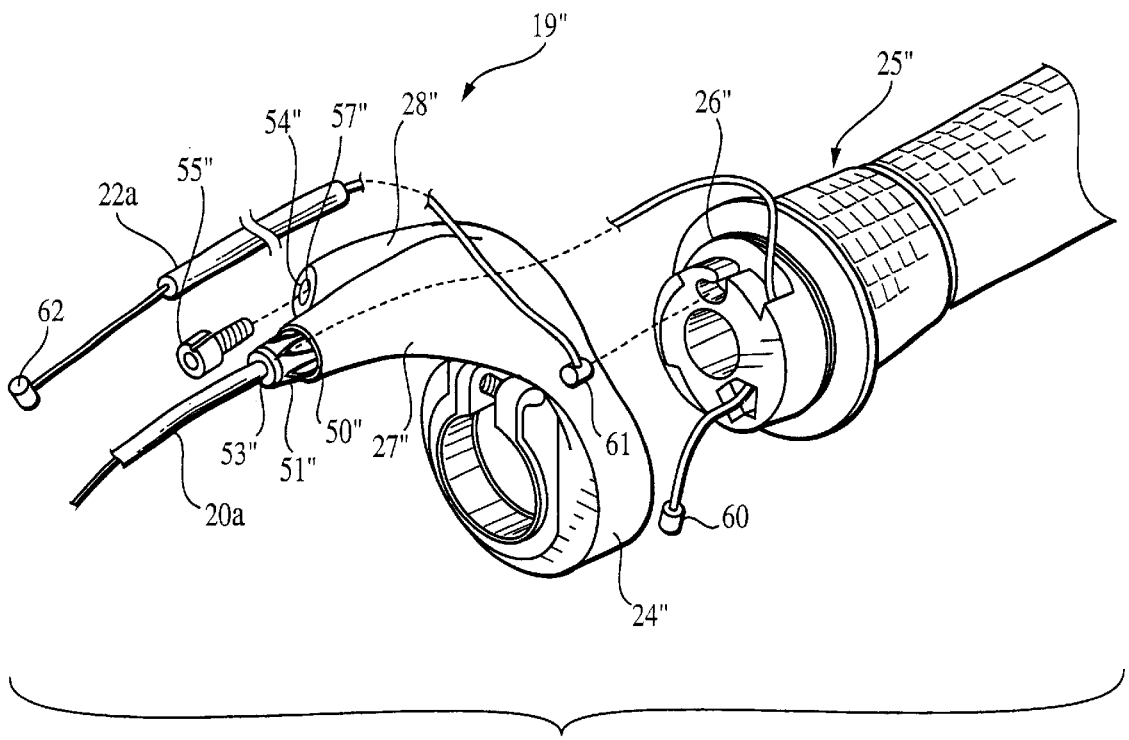
FIG. 14 is a partial perspective view of a right shift operating device coupled thereto in accordance with another embodiment of the present invention.
Figure 15:
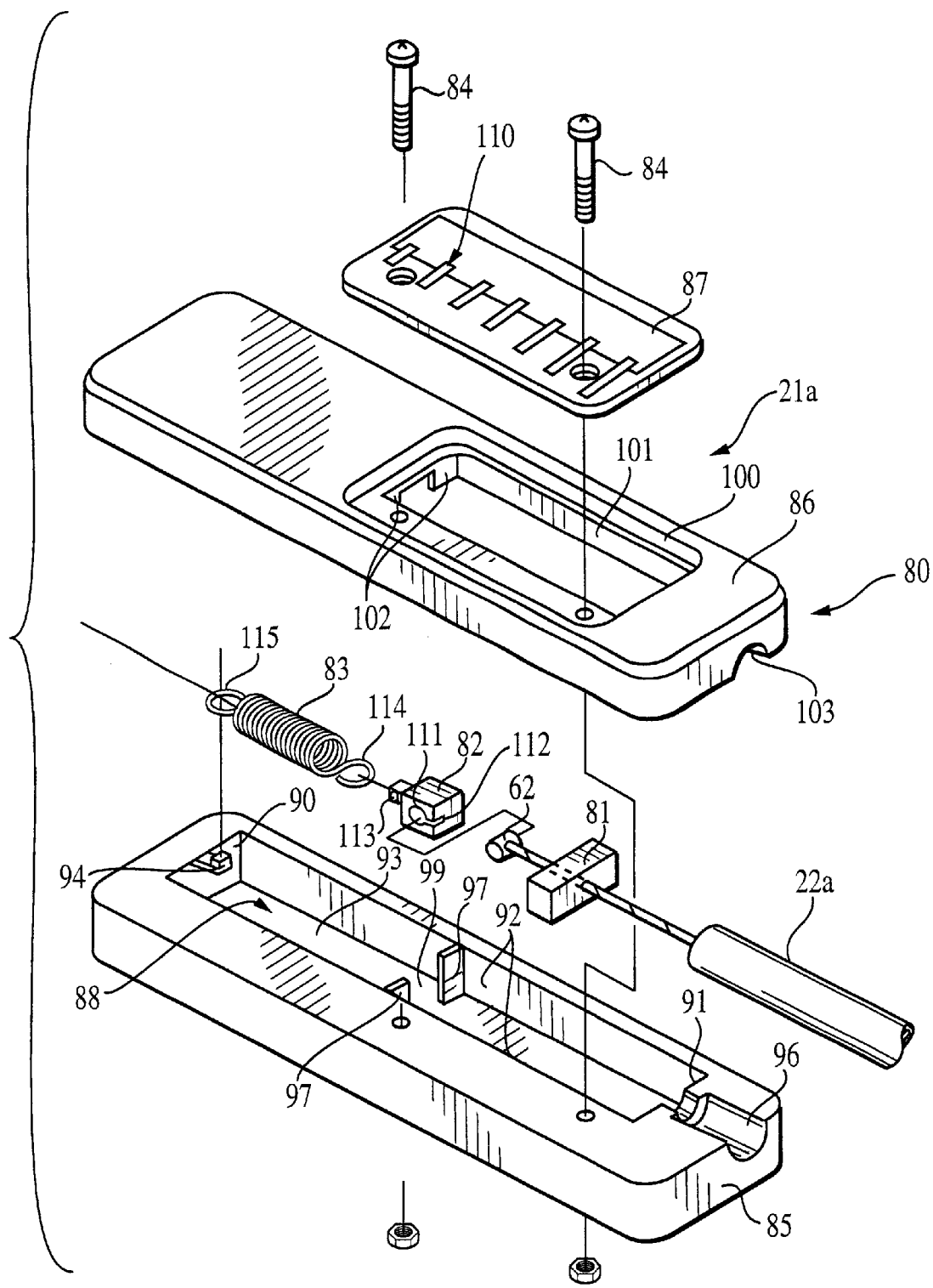
FIG. 15 is an exploded perspective view of a portion of right gear indicator assembly illustrated in FIG. 2 with certain parts not illustrated.
Figure 16:
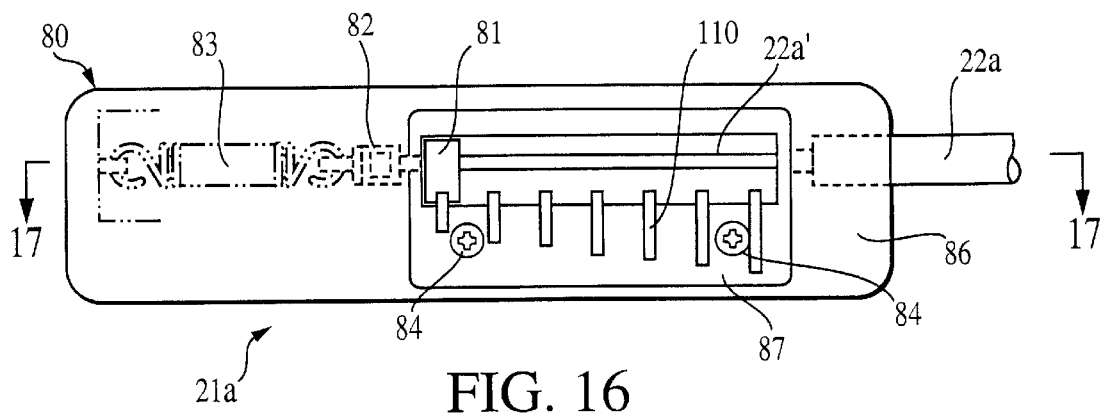
FIG. 16 is a top plan view of the right gear indicator illustrated in FIGS. 2 and 15 for the right shift operating device illustrated in FIGS. 2 and 3 in accordance with one embodiment of the present invention.
Figure 17:
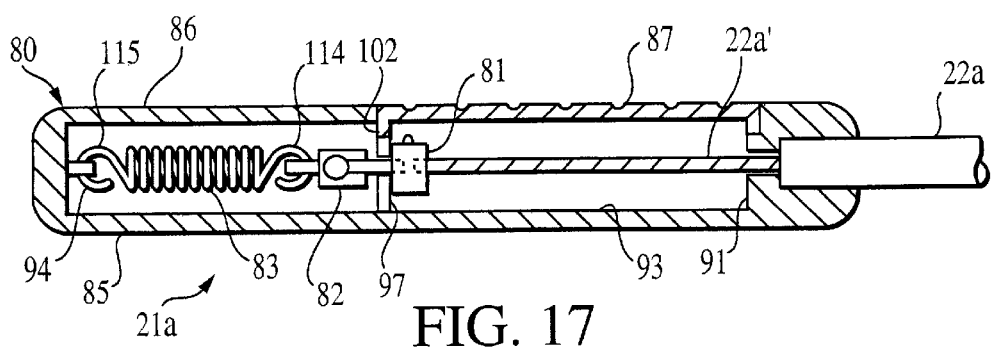
FIG. 17 is a longitudinal cross-sectional view of the right gear indicator illustrated in FIGS. 2, 15 and 16 for the right shift operating device illustrated in FIGS. 2 and 3 in accordance with one embodiment of the present invention as viewed along section line 17—17 of FIG. 16.
Figure 18:
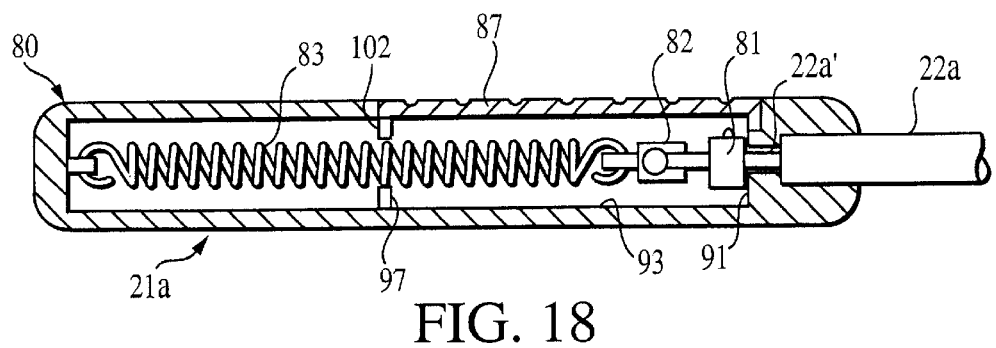
FIG. 18 is a longitudinal cross-sectional view of the right gear indicator illustrated in FIGS. 15 through 17 for the right shift operating device illustrated in FIGS. 2 and 3 in accordance with one embodiment of the present invention as viewed along section line 17—17 of FIG. 16 with the indicator member in the low gear (rightmost) position.
Figure 19:
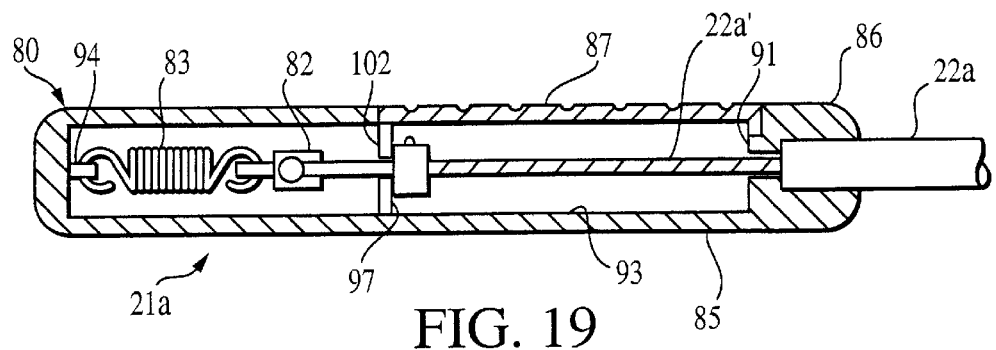
FIG. 19 is a longitudinal cross-sectional view of the right gear indicator illustrated in FIGS. 15 through 18 for the right shift operating device illustrated in FIGS. 2 and 3 in accordance with one embodiment of the present invention as viewed along section line 17—17 of FIG. 16 with the indicator member in the high gear (leftmost) position after elongation of the cable.

Referring now to FIG. 14, a further alternative embodiment of the shift operating device 19" is illustrated in accordance with the present invention. Shift operating device 19" basically includes an attachment portion 24", a hand operating portion 25", a take-up member 26", a shift cable housing support 27" and an indicator cable housing support 28". Shift cable housing support 27" and an indicator cable housing support 28" are integrally formed with a portion of attachment portion 24".

Similar to the second embodiment, this shift operating device 19" is a grip-type shifter in which rotation of the grip causes shifting of the gears. This alternative shift operating device 19" is designed to be utilized with either first or second gear indicators 21a or 21b as well as with gear indicator holder 23.

This shift operating device 19" is a simplified grip-type of shifting device. In particular, when shift operating device 19" is operatively coupled to rear derailleur 17 and gear indicator 21a rotation of the grip or hand operating portion 25" causes the shift cable 20a and the indicator cable 22a to be released or pulled for shifting gears. The basic difference between this third embodiment and the second embodiment is that a single take-up member 26" is utilized. This take-up member 26" is located about a longitudinal axis X that is substantially parallel or concentric with the longitudinal axis X of the handlebar portion upon which the shift operating device 19" is attached. Take-up member 26" is substantially identical to take up member 26 of the first embodiment, except that the central pivot opening 34" is larger to accommodate handlebar 13 therein.

Preferably, shift cable housing support 27" has a threaded bore 50" for receiving an adjustment member or barrel 51 therein. The adjustment member 5" is threadedly received in the threaded bore 50" of shift cable housing support 27" so that the relative position of the outer casing and the inner wire of shift cable 20a can be adjusted relative to each other. Adjustment member 51" has a shift cable housing receiving bore 53". This shift cable housing receiving bore 53" is preferably a bore with a four to five millimeter diameter or slightly larger than a five millimeter diameter. In particular, shift cable housing receiving bore 53" is designed to receive a four or five millimeter diameter shift cable 20a. Preferably, the longitudinal axis of shift cable housing receiving bore 53" extends substantially parallel to the longitudinal axis of handlebar 13.

Indicator cable housing support 28" preferably has a threaded bore 54" for receiving an adjustment member 55" such that the adjustment member 55" can be longitudinally adjusted relative to indicator cable housing support 28". The adjustment member 55" has an axially extending indicator housing receiving bore 56". Indicator cable housing receiving bore 56" is substantially parallel to shift cable housing receiving bore 53" such that shift cable 20a and indicator cable 22a extend substantially parallel to the longitudinal axis X of the handlebar 13 as they exit their respective cable housing supports 27" and 28". A slit 57" is formed in indicator cable housing support 28" and adjustment member 55" to permit easy installation of indicator cable 22a.

In view of the similarities of this embodiment with prior embodiments, this embodiment will not be discussed or illustrated in detail herein. Rather, it will be apparent to those skilled in the art from this disclosure that the description of the prior embodiments, the subsequent embodiments, can be utilized to understand the operation and construction of this embodiment.

Turning now to FIGS. 15–19, gear indicator 21a will now be described in more detail. Gear indicator 21a basically includes a housing 80, an indicator member 81, a cable hook adapter 82, a biasing member 83 and a pair of fasteners 84. Housing 80 is preferably constructed of three pieces connected together by the fasteners 84. In particular, the housing 80 has a first housing part 85, a second housing part 86 and a transparent cover 87 that are all fixedly coupled together by the fasteners 84.

The first housing part 85 and the second housing part 86 have the indicator member 81 slidably received therebetween and viewable through the transparent cover 87. More specifically, first housing part 85 has a cavity 88 forming an indicator path with the indicator member 81 movably positioned therein. The first housing part 85 has a first end 90, a second end 91, a pair of lateral side walls 92 and a bottom wall 93. The first end 90 has a hook 94 for fastening the biasing member 83 thereto, while the second end 91 has a semi-circular groove or recess 96. More specifically, recess 96 forms half of an indicator cable receiving opening that is a step-shaped bore.

The side walls 92 each has a first (lower) stopper or abutment 97 extending inwardly into the cavity 88. These first (lower) stoppers 97 are substantially aligned with each other and spaced apart to form a slit 99, which is large enough that the cable hook adapter 82 and a portion of the biasing member 83 can pass therethrough. However, this slit 99 is smaller than the width of the indicator member 81 so that the indicator member 81 cannot pass therethrough.

The second housing part 86 is substantially identical to the first housing part 85, except that it is a mirror image of the first housing part 85 and also includes a viewing window 100 formed in its upper surface for receiving transparent cover 87 therein. More specifically, second housing part 86 has a longitudinally extending cavity 101 that joins with the cavity 88 of the first housing part 85. Also, a pair of first (upper) stoppers or abutments 102 extend inwardly into the cavity 101 in substantially the same position as the other first (lower) stoppers 97 of the first housing part 85 on one side of the viewing window or opening 100.

The second housing part 86 also has a longitudinally extending recess 103 that is a step-shaped recess having a first semi-cylindrical portion and a second semi-cylindrical portion for receiving a portion of the indicator cable 22*a* therein. When the first and second housing parts 85 and 86 are joined together, the longitudinal recesses 96 and 103 form a step-shaped bore having a first cylindrical section sized to receive the outer casing of the indicator cable and a second cylindrical section which allows an inner wire 22*a*' of the indicator cable 22*a* to pass therethrough such that the end of the inner wire of indicator cable 22*a* can be coupled to indicator member 81.

Indicator member 81 is frictionally retained on the first end (first cable end) of the inner wire 22*a*' of the indicator cable 22*a*. In other words, indicator member 81 is normally frictionally held in its position until a force is applied that is greater than the friction force between the indicator member 81 and the inner wire 22*a*' of indicator cable 22*a*. Preferably, the biasing member 83 has a biasing force that is greater than the friction force between the indicator member 81 and the inner wire 22*a*' of the indicator cable 22*a* as explained below. Preferably, the indicator member 81 is a hard, rigid member constructed of a suitable material such as a plastic material. The indicator member 81 preferably extends substantially the entire width of the housing cavity such that the indicator member 81 does not tilt within the housing cavity.

Transparent cover 87 preferably includes a gear position indicia portion 110 having a plurality of markings (seven) graphically representing the size of the gear that is currently being utilized. In other words, when the indicator member 81 is aligned with one of the marks, this will indicate which gear is engaged by the chain 16.

Cable hook adapter 82 has a transverse bore 111 and a slit 112. Transverse bore 111 receives nipple 62 of the indicator cable 22*a*, while slit 112 receives the inner wire of the indicator cable 22*a* such that cable hook adapter 82 is retained on the nipple 62 of the inner wire of indicator cable 22*a*. Cable hook adapter 82 also has a hook 113 on the opposite end from the slit end. This hook 113 engages one of the ends of the biasing member 83 for fastening the biasing member 83 to the cable end of the inner wire of the indicator cable 22*a*.

The biasing member 83 is preferably a coil tension spring. The biasing member 83 has a first biasing end 114 coupled to the first cable end of the inner wire of indicator cable 22*a* and a second biasing end 115 coupled to the interior of the housing. More specifically, the first biasing end 114 has a hook that engages the hook 113 of the cable hook adapter 82. The second biasing end 115 also has a hook that engages the hook 94 of the first housing part 85.

The fasteners 84 are preferably a pair of screws and a pair of nuts that extend through holes formed in the first housing part 85, the second housing part 86 and the transparent cover 87 to fixedly secure the three parts together.

In the illustrated embodiment of the gear indicator 21*a*, the high gear position or small sprocket position is located at the left end of the movement of the indicator member, while the low gear position or large sprocket position is located at the right end of the movement of the indicator member 81. Of course, it will be apparent to those skilled in the art from this disclosure that the positions of the high and low gears can be reversed. The arrangement of the gear positions on the indicator 21*a* will depend upon the type of derailleur being used and the direction of the force of the derailleur's biasing member.

When the gear indicator 21*a* is assembled, and the chain 16 is on the small sprocket, indicator member 81 is moved to the leftmost position (leftmost gear position mark) such that it abuts against the first (lower) stoppers 97 and the first (upper) stoppers 102. In this position, the first stoppers 97 and 102 are located between the indicator member 81 and the cable hook adapter 82. When the chain 16 is moved by the shift operating device 19*a*, the indicator member 81 will move a predetermined distance that corresponds with the next gear position mark on the transparent cover 87. In other words, the gear positioning marks or indicia on the transparent cover 87 are spaced predetermined distances from the first stoppers 97 and 102, with the distance from the first stoppers 97 and 102 to each gear positioning marks or indicia corresponding to the distance of movement from the small gear to that particular gear. The second end or wall 91 of the cavity 88 forms a second stopper on the opposite side of the viewing opening or window 100 from the first stoppers 97 and 102. The second stopper (wall 91) corresponds to the low position or the large sprocket. Accordingly, in the event that the indicator cable 22*a* becomes elongated, this indicator member 81 will automatically adjust or recalibrate the indicator member 81 relative to the gear position marks of the housing 80. Moreover, if during assembly, the indicator member 81 is accidentally moved from its set position, the indicator member 81 will engage one of the first stoppers 97 and 102, or the second stopper 91 so as to recalibrate or readjust the unit to its proper position.

While the gear position indicia portion 110 is formed on the transparent cover 87, it will be apparent to those skilled in the art from this disclosure that the gear position indicia portion 110 could be formed on one of the housing parts, if needed and/or desired. In particular, in this embodiment, it is only necessary that the gear position indicia portion 110 be non-movably located relative to the stoppers 97 and 102.

Figure 20:
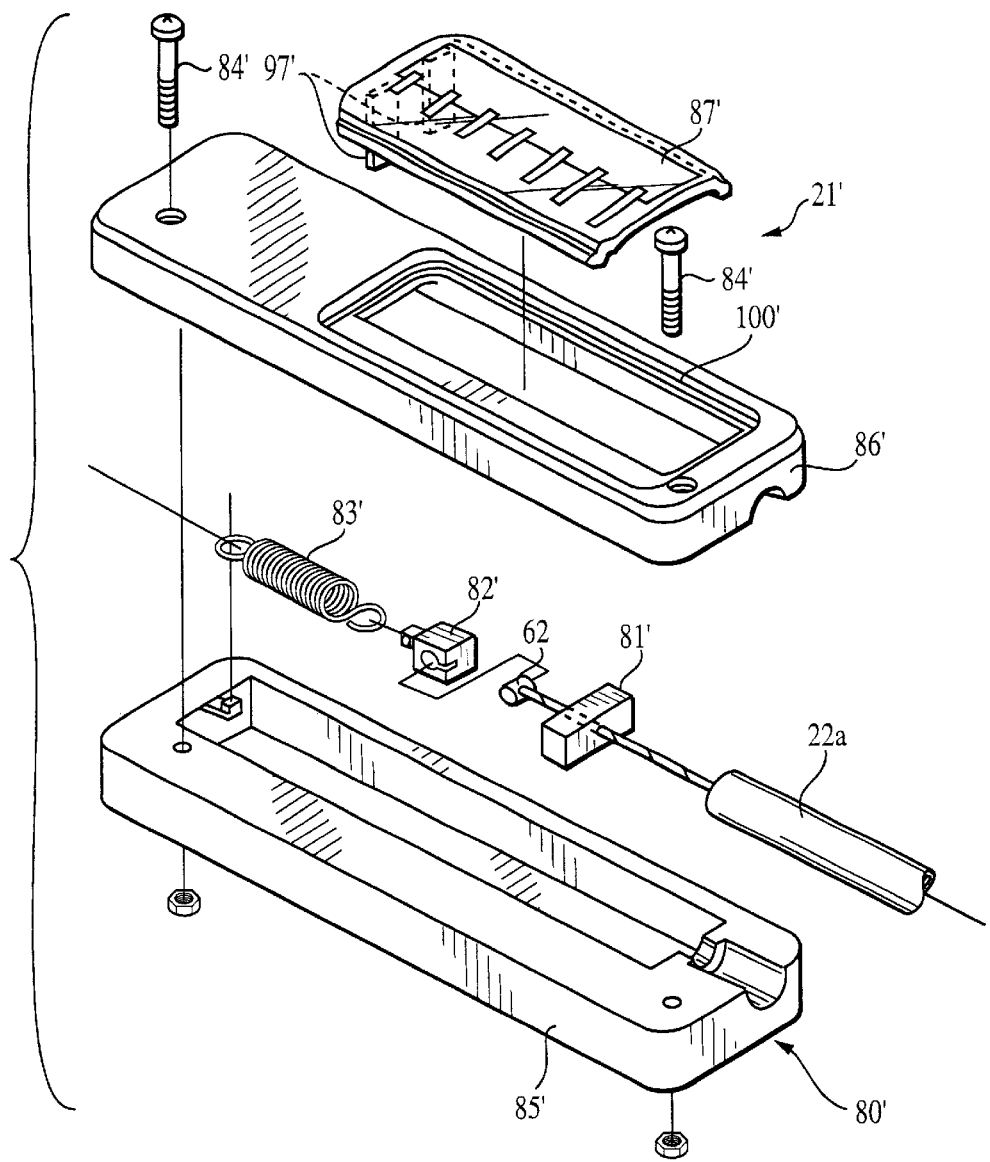
FIG. 20 is an exploded perspective view of a portion of right gear indicator assembly illustrated in accordance with another embodiment of the present invention.
Figure 21:
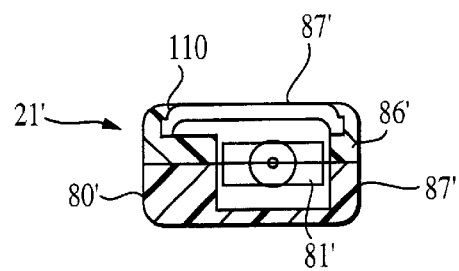
FIG. 21 is a transverse cross-sectional view of the right gear indicator illustrated in FIG. 20 in accordance with another embodiment of the present invention.

Referring now to FIGS. 20 and 21, an alternate embodiment of the gear indicator 21' is illustrated in accordance with the present invention. In this embodiment, the indicator member 81' can be fixedly coupled to the inner wire of the cable 22*a* such that there is no relative movement. Rather, the automatic adjustment is accomplished by having the transparent cover 87' being frictionally engaged with the upper housing part 86', and having the stoppers 97' formed on the transparent cover 87'. In view of the similarities between this embodiment and the first embodiment of the gear indicator 21*a*, this embodiment of the gear indicator 21' will not be discussed or illustrated in detail herein. Rather, it will be apparent to those skilled in the art that the description of the construction and operation of the first embodiment can be easily extrapolated to this embodiment.

Gear indicator 21' basically includes a housing 80', an indicator member 81', a cable hook adapter 82', a biasing member 83' and a pair of fasteners 84'. Housing 80' is preferably constructed of three pieces connected together by the fasteners 84'. In particular, the housing 80' has a first housing part 85' and a second housing part 86' that are fixedly coupled together by the fasteners 84'. A transparent cover 87' is frictionally retained within viewing window 100'. The first housing part 85' and the second housing part 86' have the indicator member 81' slidably received therebetween and viewable through the transparent cover 87'. Transparent cover 87' is moved by stoppers 97' being engaged with indicator 81' upon elongation of indicator cable 22*a* or misalignment of indicator member 81'.

Figure 22:
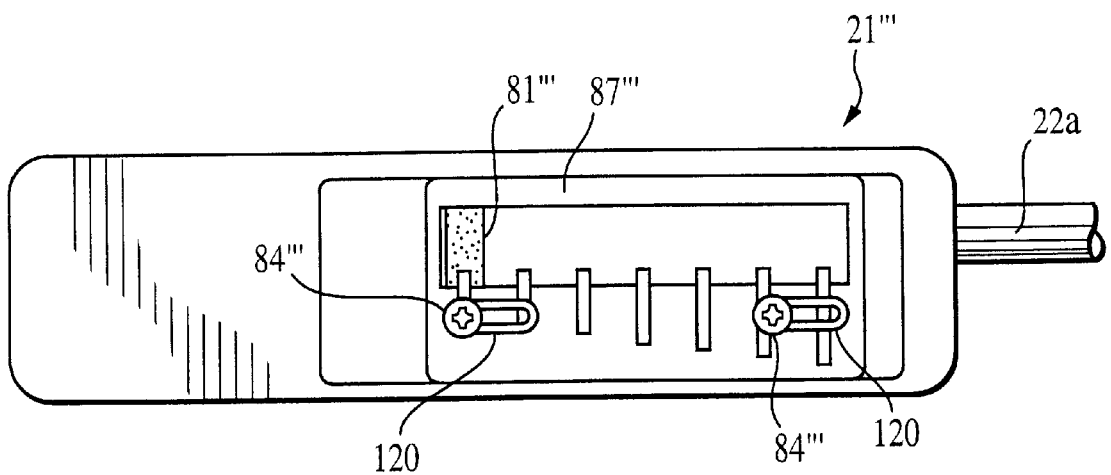
FIG. 22 is a top plan view of a portion of right gear indicator assembly illustrated in accordance with another embodiment of the present invention.
Figure 23:
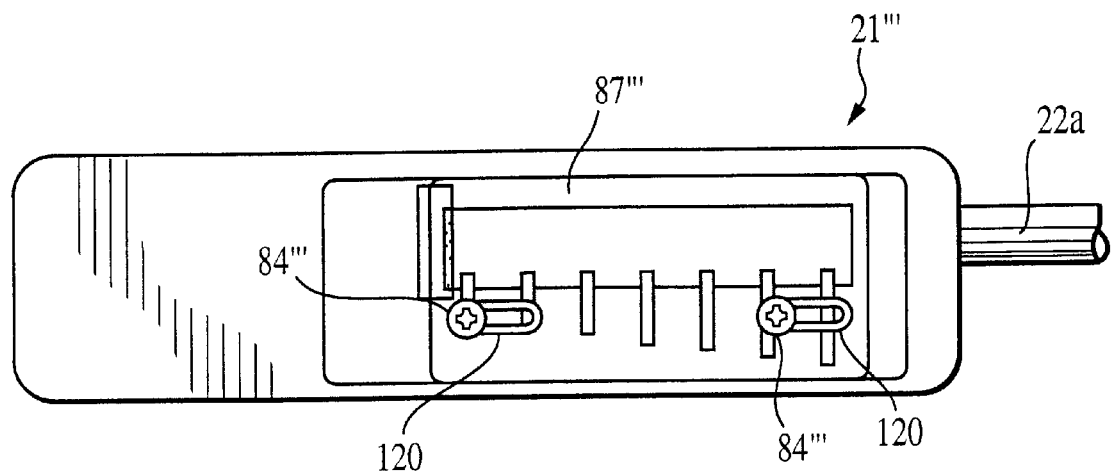
FIG. 23 is a top plan view of the right gear indicator illustrated in FIG. 22 with the indicator member in the high gear (leftmost) position after elongation of the cable, but prior to adjustment of the cover.
Figure 24:
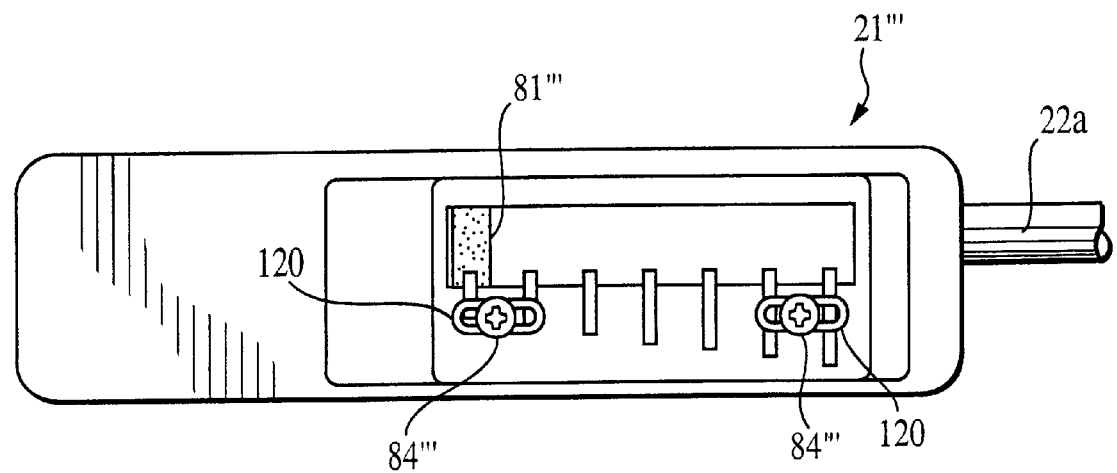
FIG. 24 is a top plan view of the right gear indicator illustrated in FIGS. 22 and 23 with the indicator member in the high gear (leftmost) position after elongation of the cable, but after adjustment of the cover.

Referring now to FIGS. 22 through 24, an alternate gear indicator 21''' is illustrated in accordance with another embodiment of the present invention. In this embodiment, the gear indicator 21''' is no longer automatically adjusted to compensate for elongation indicator cable 22*a* or misaligment of the indicator member 81′′′. In this embodiment, the stoppers have been eliminated, and the transparent cover 87′′′ is manually adjusted. This manual adjustment can occur by either having a friction fit between the transparent cover 87′′′ and the fasteners 84′′′ or by loosening the fasteners 84′′′ to allow for the transparent cover 87′′′ to be moved along its longitudinal axis.

Basically, the transparent cover 87′′′ is provided with a pair of elongated slots 120 with the fasteners 84′′′ located therein. Accordingly, the transparent cover can be moved along the recess formed in the upper housing part. While the transparent cover 87′′′ is illustrated with slots 120 that engage stationary fasteners 84′′′ secured to the housing 80′′′, it will be apparent to those skilled in the art from this disclosure that other types of sliding arrangements can be utilized. For example, the slots could be formed in the housing parts, and a pair of tabs can be extending from the transparent cover into the slots of the housing parts to control the movement of the transparent cover. In other words, the fasteners would be stationary relative to the transparent cover, but movable relative to the upper and lower housing parts.

Referring now to FIGS. 25 and 26, gear indicator holder 23 will now be discussed in more detail, Gear indicator holder 23 is designed to allow the shifting units 11a and 11b to be easily installed onto handlebars 13. Moreover, the gear indicator holder 23 is designed to accommodate various handlebars. Gear indicator holder 23 adjustably supports gear indicators 21a and 21b such that gear indicators 21a and 21b can move in a direction that is substantially perpendicular to the vertical center plane of the bicycle. More specifically, gear indicator holder 23 is designed to be mounted adjacent to the center of the handlebar 13 with the gear indicators 21a and 21b being slidably coupled thereto for movement generally along the longitudinal axis of handlebar 13.

Basically, gear indicator holder 23 includes an attachment portion 121 and a gear indicator support portion 122. The attachment portion 121 is preferably a clamping member that engages the handlebar 13 to secure gear indicator holder 23 to handlebar 13. In the illustrated embodiment, attachment portion 121 has a tubular clamping section 123 that is split along its longitudinal axis to form a pair of clamping jaws that are coupled together via a fastener 124. Of course, it will be apparent to those skilled in the art from this disclosure that the fastener 124 can be eliminated and that a snap-on type of clamp could be utilized. In any event, it is preferred that the attachment portion 121 be integrally formed or molded with the support portion 122 as a one-piece, unitary member. Preferably, the attachment portion 121 (minus the fastener 124) and the support portion 122 are formed of a plastic material.

The support portion 122 preferably includes a base having a substantially planar support surface with six coupling members 125 extending outwardly from the planar surface of the base. The coupling members 125 are preferably arranged in three rows so as to form a pair of retaining slots for slidably receiving gear indicators 21a and 21b, respectively. More specifically, the coupling members 125 extend substantially perpendicular to the base with two of the coupling members 125 being common between the two retaining slots. Each of the coupling members 125 has a free end with an abutment surface to retain the gear indicators 21a and 21b thereon. Preferably, the retaining slots are formed such that their longitudinal axes are substantially parallel to each other. These longitudinal axes are preferably also parallel to the longitudinal axis of the handlebar at its center portion.

Figure 27:
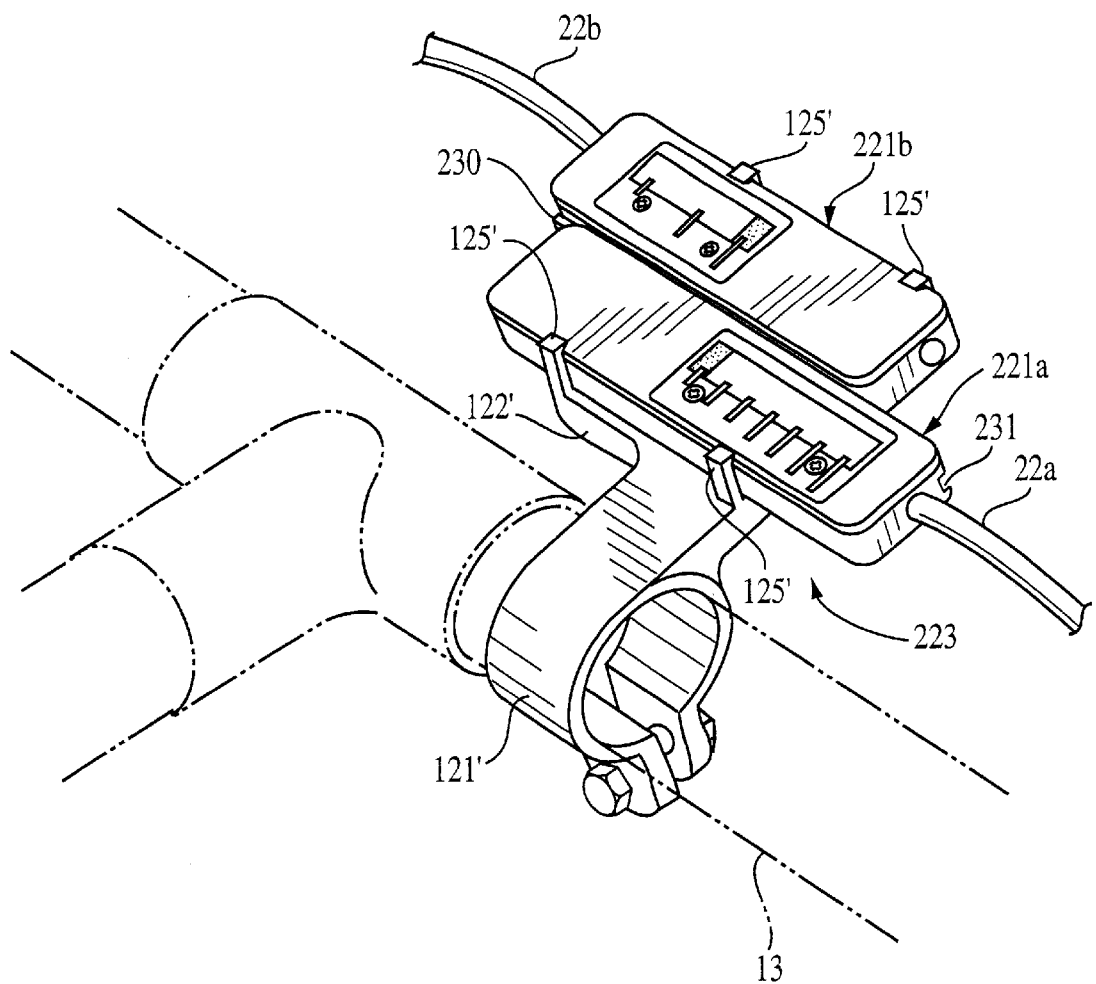
FIG. 27 is a partial front perspective view of the handlebar with the gear indicators mounted thereto by a gear indicator holder in accordance with another embodiment of the present invention.
Figure 28:
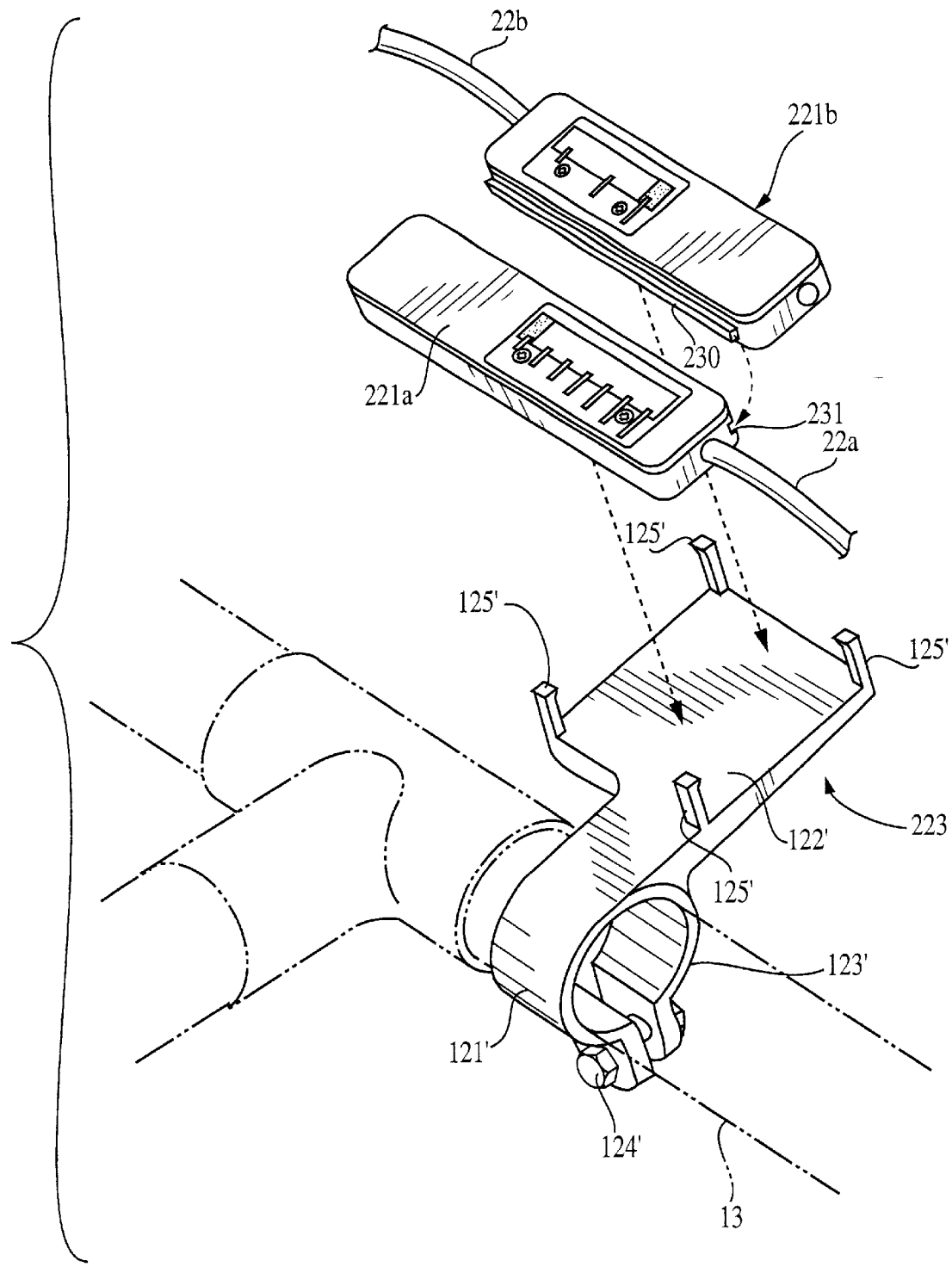
FIG. 28 is an exploded partial front perspective view of the handlebar with the gear indicators mounted thereto by the gear indicator holder illustrated in FIG. 27 in accordance with the present invention.

Referring now to FIGS. 27 and 28, an alternate indicator assembly is illustrated in accordance with another embodiment of the present invention. This alternate indicator assembly has a modified gear indicator holder 223 for holding a pair of modified gear indicators 221a and 221b. In this embodiment, gear indicator holder 223 has been simplified and the housings of gear indicators 221a and 221b have been modified to be coupled together in a sliding manner.

Gear indicator holder 223 adjustably supports gear indicators 221a and 221b such that gear indicators 221a and 221b can move in a direction that is substantially perpendicular to the vertical center plane of the bicycle. More specifically, gear indicator holder 223 is designed to be mounted adjacent to the center of the handlebar 13 with the gear indicators 221a and 221b being slidably coupled thereto for movement generally along the longitudinal axis of handlebar 13.

Basically, gear indicator holder 223 includes an attachment portion 121′ and a gear indicator support portion 122′. The attachment portion 121′ is preferably a clamping member that engages the handlebar 13 to secure gear indicator holder 223 to handlebar 13. In the illustrated embodiment, attachment portion 121′ has a tubular clamping section 123′ that is split along its longitudinal axis to form a pair of clamping jaws that are coupled together via a fastener 124′. Of course, it will be apparent to those skilled in the art from this disclosure that the fastener 124′ can be eliminated and that a snap-on type of clamp could be utilized. In any event, it is preferred that the attachment portion 121′ be integrally formed or molded with the support portion as a one-piece, unitary member. Preferably, the attachment portion (minus the fastener) and the support portion are formed of a plastic material.

The support portion 122′ preferably includes a brace having a substantially planar support surface with four coupling members 125′ extending outwardly from the planar surface of the base. The coupling members 125′ are preferably arranged in two rows so as to form a single retaining slot with a sliding surface on support portion 122′ for slidably receiving gear indicators 221a and 221b, respectively. More specifically, the coupling members 125′ extend substantially perpendicular to the base. Each of the coupling members 125′ has a free end with an abutment surface to retain the gear indicators 221a and 221b thereon. The longitudinal axis of the retaining slot or space defined by the coupling members 125′ in this embodiment is preferably parallel to the longitudinal axis of the handlebar at its center portion.

Gear indicators 221a and 221b are slidably coupled together by a rib and slot configuration. More specifically, gear indicator 221b has a longitudinally extending rib 230 that is integrally formed with its housing, while gear indicator 221a has a longitudinally extending slot 231 that is integrally formed in its housing. This rib and slot arrangement can be a mortise and tenon arrangement that holds gear indicators 221a and 221b together.

While several embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bicycle gear indicator comprising:

a wire having a first end and an indicator member coupled to said wire adjacent said first end, said indicator member being retained on said wire such that said indicator member normally moves linearly in a longitudinal direction with said wire;

a housing having said first end and said indicator member movably located therein, a viewing opening to view movement of said indicator member, and a gear position indicia portion coupled to said housing in a first position relative to said indicator member to indicate a gear position, said gear position indicia portion being configured to be moved in said longitudinal direction relative to said housing from said first position to a second position without detaching said gear position indicia portion from said housing; and a biasing member having a first biasing end coupled to said first end of said wire and a second biasing end coupled to said housing.

2. A gear indicator according to claim 1, wherein said housing includes a first housing and a second housing coupled together with at least one of said first and second housings defining said viewing opening.

3. A gear indicator according to claim 1, wherein said first end has a nipple fixedly coupled thereto.

4. A gear indicator according to claim 3, wherein said first biasing end is coupled to said nipple of said first end by a cable adapter hook.

5. A gear indicator according to claim 1, wherein said wire is an inner wire of a cable with an outer casing and said housing has a cable receiving opening that is sized to support said outer casing of said cable, and said first end of said inner wire terminates within said housing.

6. A gear indicator according to claim 1, wherein said biasing member has a longitudinal axis that is aligned with a longitudinal axis of said first end of said wire.

7. A gear indicator according to claim 1, wherein said housing includes a transparent cover overlying said viewing opening.

8. A gear indicator according to claim 7, wherein said transparent cover includes said gear position indicia portion.

9. A gear indicator according to claim 1, wherein said gear position indicia portion has a plurality of marks that graphically represents size of gears.

10. A gear indicator according to claim 1, wherein said gear position indicia portion has a first stopper located to engage said indicator member upon elongation of said wire and/or movement of said wire to one of its end gear positions, and said gear position indicia portion is frictionally coupled to said housing for movement upon engagement of said first stopper with said indicator member.

11. A gear indicator according to claim 10, wherein said housing includes a transparent cover overlying said viewing opening.

12. A gear indicator according to claim 11, wherein said transparent cover includes said gear position indicia portion of said housing.

13. A gear indicator according to claim 10, wherein said gear position indicia portion includes a plurality of marks that graphically represents size of gears.

14. A bicycle gear indicator comprising:

a wire having a first end with a nipple fixedly coupled thereto and an indicator member coupled to said wire adjacent said first end, said indicator member being retained on said wire such that said indicator member normally moves with said wire;

a housing having said first end and said indicator member movably located therein, a viewing opening to view movement of said indicator member, and a gear position indicia portion coupled to said housing in a first position relative to said indicator member to indicate a gear position, said gear position indicia portion being configured to be moved relative to said housing from said first position to a second position; and a biasing member having a first biasing end coupled to said nipple of said first end of said wire by a cable adaptor hook and a second biasing end coupled to said housing, said cable adapter hook having a recess with said nipple located therein and a hook with said first biasing end coupled thereto.

15. A bicycle gear indicator comprising:

a wire having a first end and an indicator member coupled to said wire adjacent said first end, said indicator member being retained on said wire such that said indicator member normally moves with said wire;

a housing having said first end and said indicator member movably located therein, a viewing opening to view movement of said indicator member, and a gear position indicia portion coupled to said housing in a first position relative to said indicator member to indicate a gear position, said gear position indicia portion being configured to be moved relative to said housing from said first position to a second position; and a biasing member having a first biasing end coupled to said first end of said wire and a second biasing end coupled to said housing, said gear position indicia portion being selectively coupled to said housing via a first fastener positioned in a first elongated slot formed in either said gear position indicia portion or said housing to retain said gear position indicia portion in either of said first position or said second position.

16. A gear indicator according to claim 16, wherein said gear position indicia portion is further coupled to said housing via a second fastener position in a second elongated slot formed in either said gear position indicia portion or said housing.

17. A gear indicator according to claim 16, wherein said housing includes a recess with a length that is longer than said gear position indicia portion.

18. A gear indicator according to claim 16, wherein said first slot is formed in said gear position indicia portion.

19. A bicycle gear indicator, comprising:

a wire having a first end and an indicator member coupled to said wire adjacent said first end, said indicator member being retained on said wire such that said indicator member normally moves with said wire;

a housing having said first end and said indicator member movably located therein to move in a direction along an indicator path within said housing, said housing including a viewing opening to view movement of said indicator member and a transparent cover overlying said viewing opening, said transparent cover including a gear position indicia portion that is coupled to said housing in a first position relative to said indicator member to indicate a gear position, said transparent cover with said gear position indicia portion being configured to be moved relative to said housing from said first position to a second position spaced in the direction of movement of said indicator member from said first position without detaching said transparent cover from said housing; and a biasing member having a first biasing end coupled to said first end of said wire and a second biasing end coupled to said housing.

20. A bicycle gear indicator, comprising:

a wire having a first end and an indicator member coupled to said wire adjacent said first end, said indicator member being retained on said wire such that said indicator member normally moves with said wire;

a housing having said first end and said indicator member movably located therein to move in a direction along an indicator path within said housing, said housing including a viewing opening to view movement of said indicator member and a gear position indicia portion coupled to said housing in a first position relative to said indicator member to indicate a gear position, said gear position indicia portion being configured to be moved relative to said housing from said first position to a second position spaced in the direction of movement of said indicator member from said first position, said gear position indicia portion being movable relative to said housing independently of movement of said wire and said indicator member without detaching said gear position indicia portion from said housing; and a biasing member having a first biasing end coupled to said first end of said wire and a second biasing end coupled to said housing.

* * * * *